(12) United States Patent
Fancellu

(10) Patent No.: US 11,694,021 B2
(45) Date of Patent: Jul. 4, 2023

(54) APPARATUS FOR GENERATING ANNOTATED IMAGE INFORMATION USING MULTIMODAL INPUT DATA, APPARATUS FOR TRAINING AN ARTIFICIAL INTELLIGENCE MODEL USING ANNOTATED IMAGE INFORMATION, AND METHODS THEREOF

(71) Applicant: SAMSUNG ELECTRONICS CO., LTD., Suwon-si (KR)

(72) Inventor: Federico Fancellu, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 455 days.

(21) Appl. No.: 16/850,473

(22) Filed: Apr. 16, 2020

(65) Prior Publication Data

US 2021/0326643 A1   Oct. 21, 2021

(51) Int. Cl.
| | | |
|---|---|---|
| G06F 3/01 | (2006.01) | |
| G06F 3/048 | (2013.01) | |
| G06F 18/20 | (2023.01) | |
| G06F 40/00 | (2020.01) | |
| G06F 40/10 | (2020.01) | |

(Continued)

(52) U.S. Cl.
CPC .......... *G06F 40/169* (2020.01); *G06F 3/0481* (2013.01); *G06F 18/214* (2023.01); *G06F 40/205* (2020.01); *G06F 40/30* (2020.01); *G06V 10/945* (2022.01); *G06V 30/19147* (2022.01);

(Continued)

(58) Field of Classification Search
USPC ................ 382/100–159; 706/1–62, 900–934
See application file for complete search history.

(56) References Cited

U.S. PATENT DOCUMENTS

| | | | |
|---|---|---|---|
| 9,317,531 B2 | 4/2016 | Baker et al. | |
| 11,501,176 B2 * | 11/2022 | Mitra | ...................... G09B 19/00 |

(Continued)

FOREIGN PATENT DOCUMENTS

KR   10-1994592 B1   6/2019

OTHER PUBLICATIONS

CN-110096576, Heindorf, S; Automatically Generating Instructions For Searching And User Navigation From The Tutorial, Aug. 6, 2019 (Year: 2019).*

*Primary Examiner* — Marcellus J Augustin
(74) *Attorney, Agent, or Firm* — Sughrue Mion, PLLC

(57) ABSTRACT

A method for providing a user interface (UI) for generating training data for an artificial intelligence (AI) model may include providing, for display via the UI, image information that depicts an object, a set of operations of the object, and a process associated with the set of operations. The method may include providing, for display via the UI, text information that describes the object, the set of operations of the object, and the process associated with the set of operations. The method may include receiving, via the UI, a user input that associates respective image information of the image information with corresponding text information of the text information. The method may include generating association information that associates the respective image information with the corresponding text information, based on the user input. The method may include generating discourse and semantic information from the text information associated to the image information.

17 Claims, 25 Drawing Sheets

(51) Int. Cl.
*G06F 40/169* (2020.01)
*G06F 40/30* (2020.01)
*G06F 3/0481* (2022.01)
*G06F 40/205* (2020.01)
*G06V 30/262* (2022.01)
*G06F 18/214* (2023.01)
*G06V 30/19* (2022.01)
*G06V 10/94* (2022.01)

(52) U.S. Cl.
CPC ...... *G06V 30/19173* (2022.01); *G06V 30/274* (2022.01)

(56) References Cited

U.S. PATENT DOCUMENTS

2019/0179959 A1\* 6/2019 Dechu ................ G06F 9/453
2020/0088463 A1\* 3/2020 Jeong ................ G06F 3/011

\* cited by examiner

APPARATUS FOR GENERATING ANNOTATED IMAGE INFORMATION USING MULTIMODAL INPUT DATA, APPARATUS FOR TRAINING AN ARTIFICIAL INTELLIGENCE MODEL USING ANNOTATED IMAGE INFORMATION, AND METHODS THEREOF

BACKGROUND

1. Field

The disclosure relates to apparatuses and methods for generating annotated image information using multimodal input data in order to train an artificial intelligence (AI) model.

2. Description of Related Art

A user may watch an instructional video associated with an object in order to determine how to use the object. For example, a user may watch an instructional video regarding a device (e.g., a smartphone, a smart appliance, or the like) in order to determine how to utilize a particular function of the device, how to fix the device, or the like. However, the user may find it tedious or time-consuming to watch the entire instructional video.

An artificial intelligence (AI) model may be configured to receive a user query from a user device (e.g., via a chatbot application), identify a relevant portion of the instructional video that addresses the user query, and provide information associated with the relevant portion to the user device. In this way, the user of the user device might not be required to watch the entire instructional video, and instead may view the relevant portion. However, accurately training such an AI model may be impractical based on a scarcity of suitable training data.

In other words, an instructional video may depict a multitude of objects, operations of the objects, processes associated with the operations, and interrelationships between the various objects, operations, and processes. Training an AI model to identify the objects, operations, and processes, and to identify how the objects, operations, and processes are interrelated may be impossible because data that is annotated for all these aspects does not exist.

SUMMARY

According to an aspect of the disclosure, a device for providing a user interface (UI) for generating training data for an artificial intelligence (AI) model may include a memory that may store instructions; and a processor that may execute the instructions to: provide, for display via the UI, image information that depicts an object, a set of operations of the object, and a process associated with the set of operations; provide, for display via the UI, text information that describes the object, the set of operations of the object, and the process associated with the set of operations; receive, via the UI, a user input that associates respective image information of the image information with corresponding text information of the text information; and generate association information that associates the respective image information with the corresponding text information, based on the user input.

According to an aspect of the disclosure, a method for providing a user interface (UI) for generating training data for an artificial intelligence (AI) model may include: providing, for display via the UI, image information that depicts an object, a set of operations of the object, and a process associated with the set of operations; providing, for display via the UI, text information that describes the object, the set of operations of the object, and the process associated with the set of operations; receiving, via the UI, a user input that associates respective image information of the image information with corresponding text information of the text information; and generating association information that associates the respective image information with the corresponding text information, based on the user input.

According to an aspect of the disclosure, a non-transitory computer-readable medium storing instructions may store one or more instructions that, when executed by one or more processors of a device for training an artificial intelligence (AI) model, cause the one or more processors to: provide, for display via the UI, image information that depicts an object, a set of operations of the object, and a process associated with the set of operations; provide, for display via the UI, text information that describes the object, the set of operations of the object, and the process associated with the set of operations; receive, via the UI, a user input that associates respective image information of the image information with corresponding text information of the text information; and generate association information that associates the respective image information with the corresponding text information, based on the user input.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

As addressed above, training AI models to associate image information with corresponding text information may be impossible because data for training the AI model may not exist. Accordingly, some example embodiments herein provide a device and method that permit a user to generate training data for AI models by interacting with a user interface (UI) that displays image information and text information.

Figure 1:
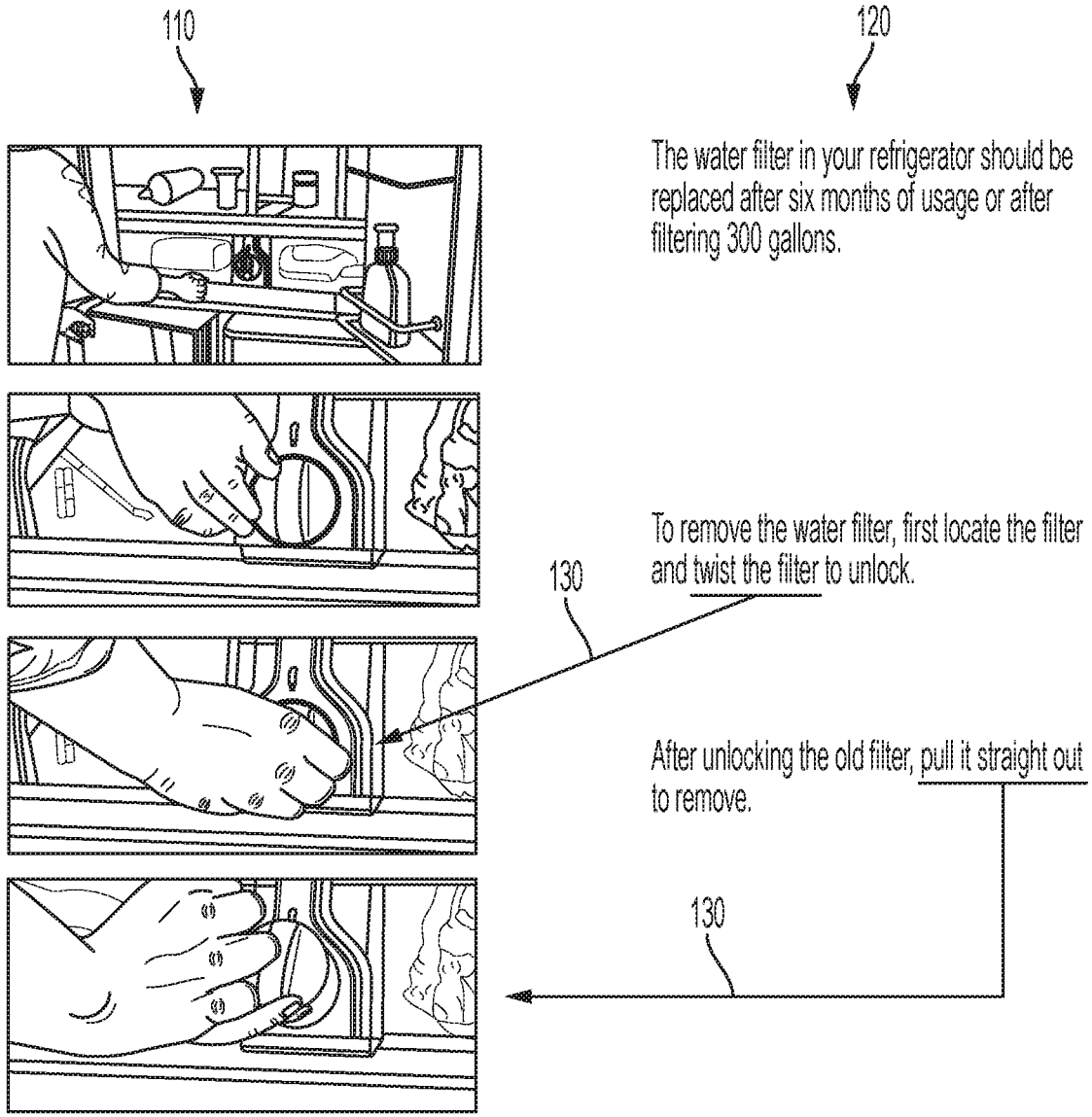
FIG. 1 is a diagram of an overview of an example implementation according to an embodiment.

FIG. 1 is a diagram of an overview of an example implementation according to an embodiment. As shown in FIG. 1, a user device (not shown) may display (e.g., via a UI) image information 110 that depicts an object (e.g., a water filter), a set of operations of the object (e.g., twisting and pulling), and a process associated with the set of operations (e.g., removal of the water filter).

As further shown in FIG. 1, the user device may display, via the UI, text information 120 that describes the object (e.g., "water filter," "filter," "old filter," and "it"), the set of operations of the object (e.g., "locate the filter," "twist the filter," "unlocking the old filter," and "pull it straight out"), and the process associated with the set of operations (e.g., "to remove the water filter").

As further shown in FIG. 1, the user device may receive, via the UI, association information 130 that associates respective image information of the image information with corresponding text information of the text information. For example, as shown, a user may interact with portions of the image information and corresponding text portions to associate the image information and the text information.

A platform (e.g., a server) may receive the association information 130, generate annotated image information based on receiving the association information, and provide the annotated image information to the AI model as training data for the AI model to permit the AI model to associate the respective image information with the corresponding text information, as described in more detail elsewhere herein.

In this way, some implementations herein permit more accurate and robust training data to be generated via user interactions via a UI. Accordingly, some implementations herein permit AI models to be trained using the generated training data.

Figure 2:
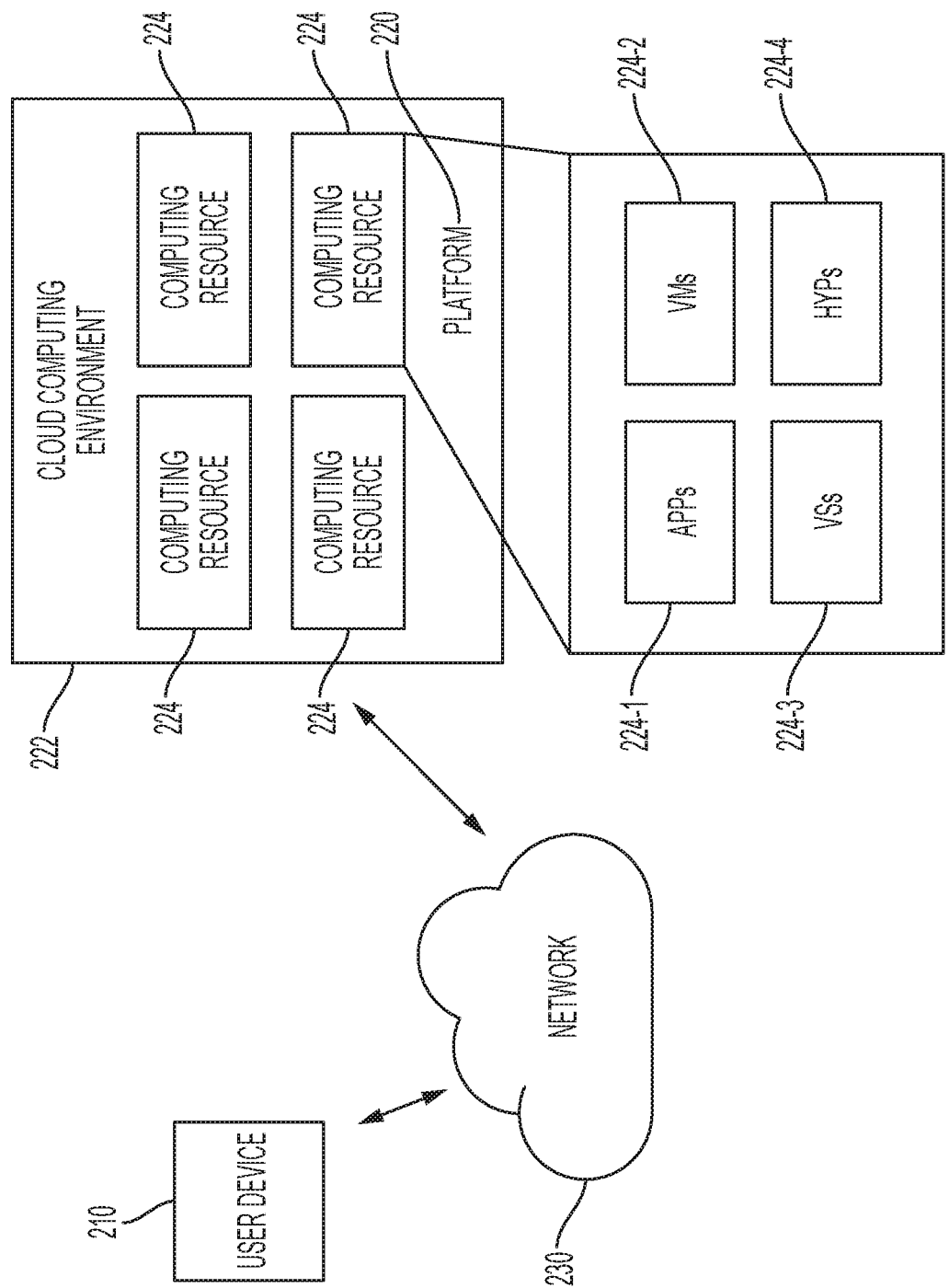
FIG. 2 is a diagram of an example environment in which systems and/or methods, described herein, may be implemented according to an embodiment.

FIG. 2 is a diagram of an example environment in which systems and/or methods, described herein, may be implemented according to an embodiment.

As shown in FIG. 2, environment 200 may include a user device 210, a platform 220, and a network 230. Devices of environment 200 may interconnect via wired connections, wireless connections, or a combination of wired and wireless connections.

User device 210 may include one or more devices capable of providing a UI for generating training data for an AI model. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. According to an embodiment, user device 210 may receive information from and/or transmit information to platform 220.

Platform 220 includes one or more devices capable of training an AI model, generating annotated image information using an AI model, and/or providing annotated image information generated by an AI model based on a query, as described elsewhere herein. According to an embodiment, platform 220 may include a cloud server or a group of cloud servers. According to an embodiment, platform 220 may be designed to be modular such that certain software components may be swapped in or out depending on a particular need. As such, platform 220 may be easily and/or quickly reconfigured for different uses.

According to an embodiment, as shown, platform 220 may be hosted in cloud computing environment 222. Notably, while implementations described herein describe platform 220 as being hosted in cloud computing environment 222, According to an embodiment, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. According to an embodiment, computing resource 224 may host platform 220. The cloud resources may include compute instances executing in computing resource 224, storage devices provided in computing resource 224, data transfer devices provided by computing resource 224, etc. According to an embodiment, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. According to an embodiment, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. According to an embodiment, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. According to an embodiment, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
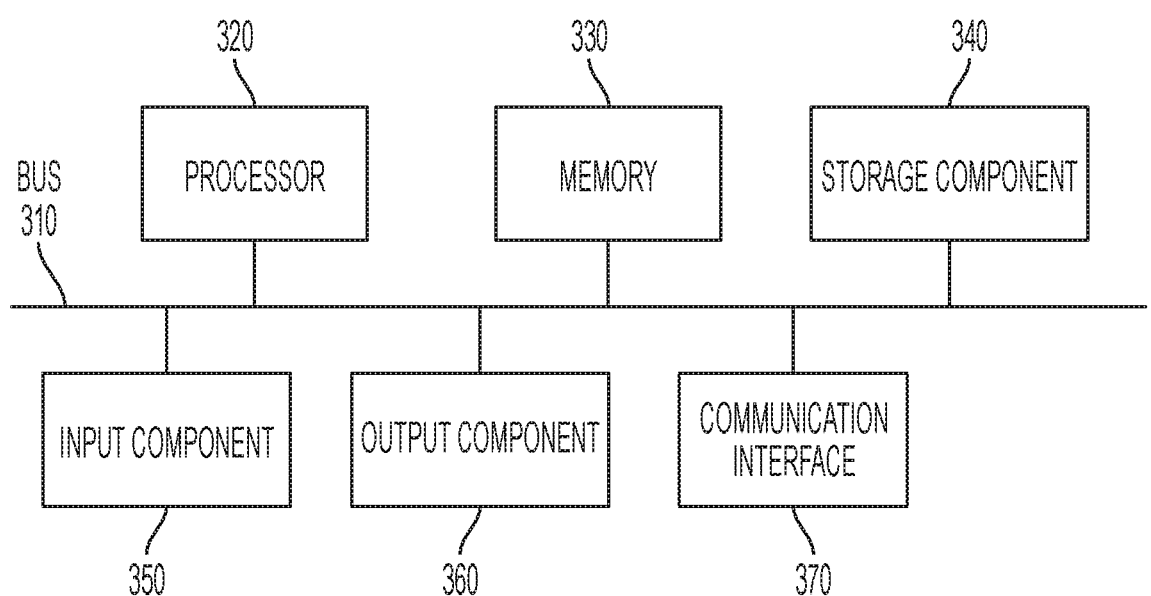
FIG. 3 is a diagram of example components of one or more devices of FIG. 2.

FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. According to an embodiment, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
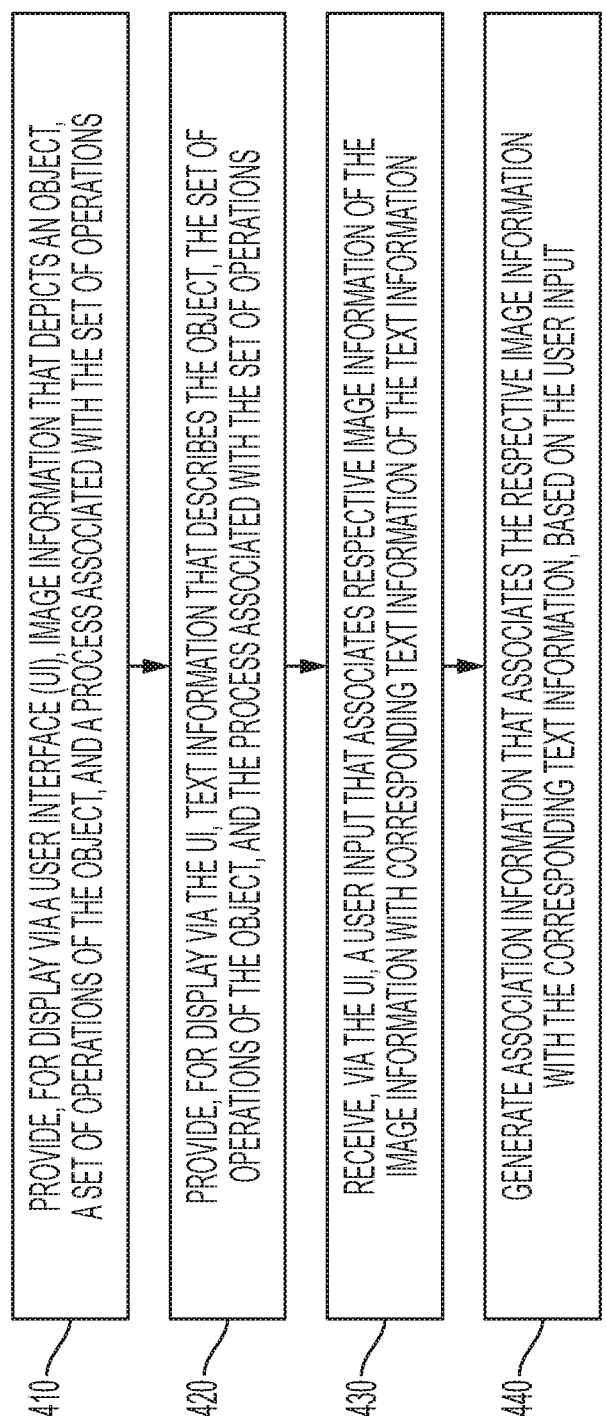
FIG. 4 is a flowchart of an example process for generating association information via a user interface according to an embodiment.

FIG. 4 is a flowchart of an example process for generating association information via a user interface according to an embodiment.

According to an embodiment, one or more process blocks of FIG. 4 may be performed by the user device 210. According to an embodiment, one or more process blocks of FIG. 4 may be performed by another device or a group of devices separate from or including the user device 210, such as the platform 220.

As shown in FIG. 4, process 400 may include providing, for display via a user interface (UI), image information that depicts an object, a set of operations of the object, and a process associated with the set of operations (block 410).

The user device 210 may execute an application for generating training data for an AI model. Further, the user device 210 may display a UI ("UI for generating training data") based on executing the application for generating training data.

The training data for the AI model may include association information that associates image information with corresponding text information, and/or may include annotated image information that includes machine-understandable text information that is associated with the association information.

The user device 210 may operate in a first mode, and display the UI for generating association information in the first mode (e.g., as described in association with FIG. 4). Additionally, the user device 210 may operate in a second mode, and display the UI for generating annotated image information in the second mode (e.g., as described in association with FIG. 6).

In this way, a user (e.g., an engineer, a subject matter expert, a natural language processing (NLP) expert, etc.) may interact with the user device 210 via the UI for generating training data in order to generate training data.

The user device 210 may display the image information in a first area of the UI for generating training data. Further, the user device 210 may display a subset of the image information in the first area of the UI for generating training data. For example, the user device 210 may display a single image of the image information, may display a set of images of the image information, or the like. In this case, the user device 210 may display the subset of image information based on temporal information associated with the image information. For example, the user device 210 may display the first image in a sequence of images, the first five images, a particular sequence of images, or the like.

The image information may be a video, a set of images of a video, a single image, or the like. The user device 210 may obtain the image information from another device, based on a user input to user device 210, based on performing a web-mining or scraping technique, based on performing an information retrieval technique, or the like.

The image information may include an image that depicts an object, a set of operations of the object, and a process associated with the set of operations. The object may be a device (e.g., a smartphone, a smart appliance, a computer, or the like), a person, an animal, a vehicle, a location, an attraction, a building, a landmark, or the like. It should be understood that the "object" may refer to substantially any type of object that may be depicted in an image. The set of operations of the object may respectively correspond to a function of the object, a manipulation of the object, a feature of the object, a movement of the object, a change in the object, a reaction of the object, or the like. The process associated with the object may correspond to a process that is performed by the set of operations.

As further shown in FIG. 4, process 400 may include providing, for display via the UI, text information that describes the object, the set of operations of the object, and the process associated with the set of operations (block 420).

The user device 210 may display the text information in a second area of the UI for generating training data. Further, the user device 210 may display a subset of the text information in the second area of the UI for generating training data. For example, the user device 210 may display a subset of text information that corresponds to the displayed subset of image information.

The user device 210 may obtain the text information from another device, based on a user input to user device 210, based on performing a web-mining or scraping technique, based on performing an information retrieval technique, based on an NLP model, or the like.

The text information may correspond to any form of text. For example, the text information may be a product manual, captions associated with the image information, audio-to-speech conversion information, text input via user device 210, or the like.

As further shown in FIG. 4, process 400 may include receiving, via the UI, a user input that associates respective image information of the image information with corresponding text information of the text information (block 430).

The user may interact with the image information and the text information that are displayed via the UI for generating training data in order to associate image information with corresponding text information. For example, the user may select an image of the image information, and select corresponding text of the text information. As another example, the user may select an object, operation, process, etc., shown in the image information, and may also select the object, operation, process, etc., described in the text information.

The user may perform a first input gesture (e.g., a selection, a click, a touch gesture, a highlighting, a bounding, a framing, etc.) in association with the image information, and may perform a second input gesture with the text information to associate image information with corresponding text information. As another example, the user may perform a single input gesture (e.g., a click and drag, a connection gesture, a drawing gesture, etc.) in association with particular image information and particular text information to associate image information with corresponding text information.

The user may modify the text information, and associate modified text information with image information. For example, the user may modify the text information in order to remove background information, resolve ambiguous expressions, change pronouns to more specific terms, correct typographical errors, or the like.

As further shown in FIG. 4, process 400 may include generating association information that associates the respective image information with the corresponding text information, based on the user input (block 440).

The user device 210 may generate association information based on the user interaction(s) that associates image information with corresponding text information.

Additionally, or alternatively, the user device 210 may receive association information from the platform 220, and may generate updated association information based on user interaction(s) with the received association information. For example, the platform 220 may generate the association information using an AI model (e.g., as described in association with FIG. 8), and may provide the generated association information to the user device 210. The user device 210 may display the generated association information, and may receive user input(s) that rectifies, updates, etc. the generated association information. Further, the user device 210 may provide feedback information based on the user input(s) to the platform 220 to update the AI model.

Although FIG. 4 shows example blocks of process 400, According to an embodiment, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example user interface for generating association information according to an embodiment.

Figure 5A:
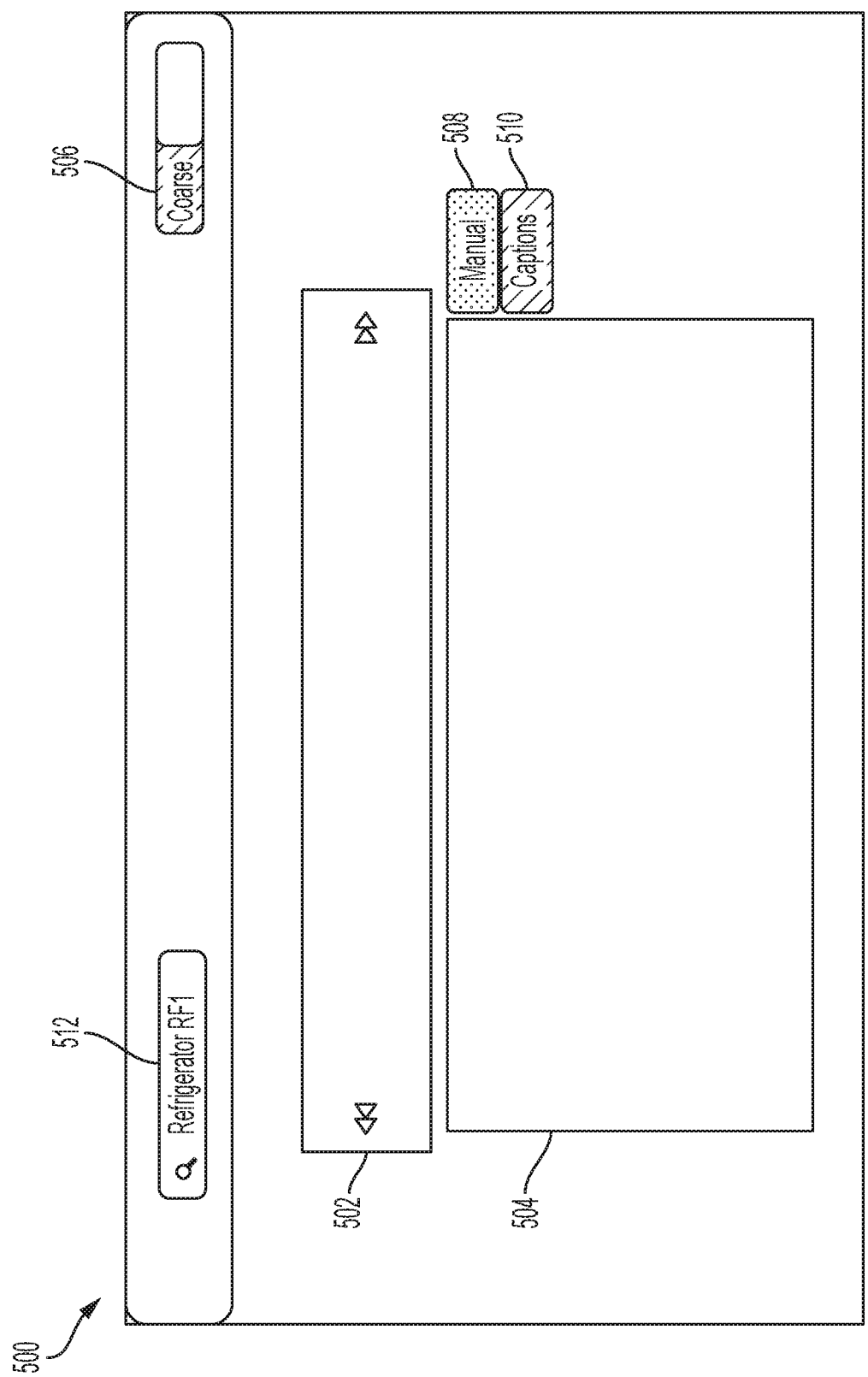
FIGS. 5A-5F are diagrams of an example user interface for generating association information.

As shown in FIG. 5A, the user device 210 may provide a UI 500 for generating training data. Specifically, as shown in FIG. 5A, the user device 210 may operate in a first mode (e.g., a coarse mode), and display the UI 500 for generating association information.

As shown, the UI 500 may include an image information area 502, a text information area 504, a mode selection icon 506, a manual icon 508, a captions icon 510, and a search area 512.

The image information area 502 may be configured to display image information. As shown, the image information area 502 may include icons (e.g., a reverse icon and a forward icon) that are configured to adjust the particular images that are displayed in the image information area 502. The text information area 504 may be configured to display text information.

The mode selection icon 506 may be configured to adjust a mode of the UI 500. For example, the mode selection icon 506 may be configured to switch between a first mode (e.g., a coarse mode) and a second mode (e.g., an expert mode). The coarse mode may be associated with generating association information, and the expert mode may be associated with generating annotated image information.

The manual 508 icon may be configured to select manual information as the text information. The captions icon 510 may be configured to select captions information as the text information.

The search area 512 may be configured to receive an input that identifies a particular object. For example, as shown in FIG. 5A, the user may input text ("Refrigerator RF1") that corresponds to a particular object for which association information is to be generated.

Although the UI 500 is shown as including particular information, it should be understood that other UIs according to the embodiments herein may be configured with different information and/or differently arranged information.

Figure 5B:
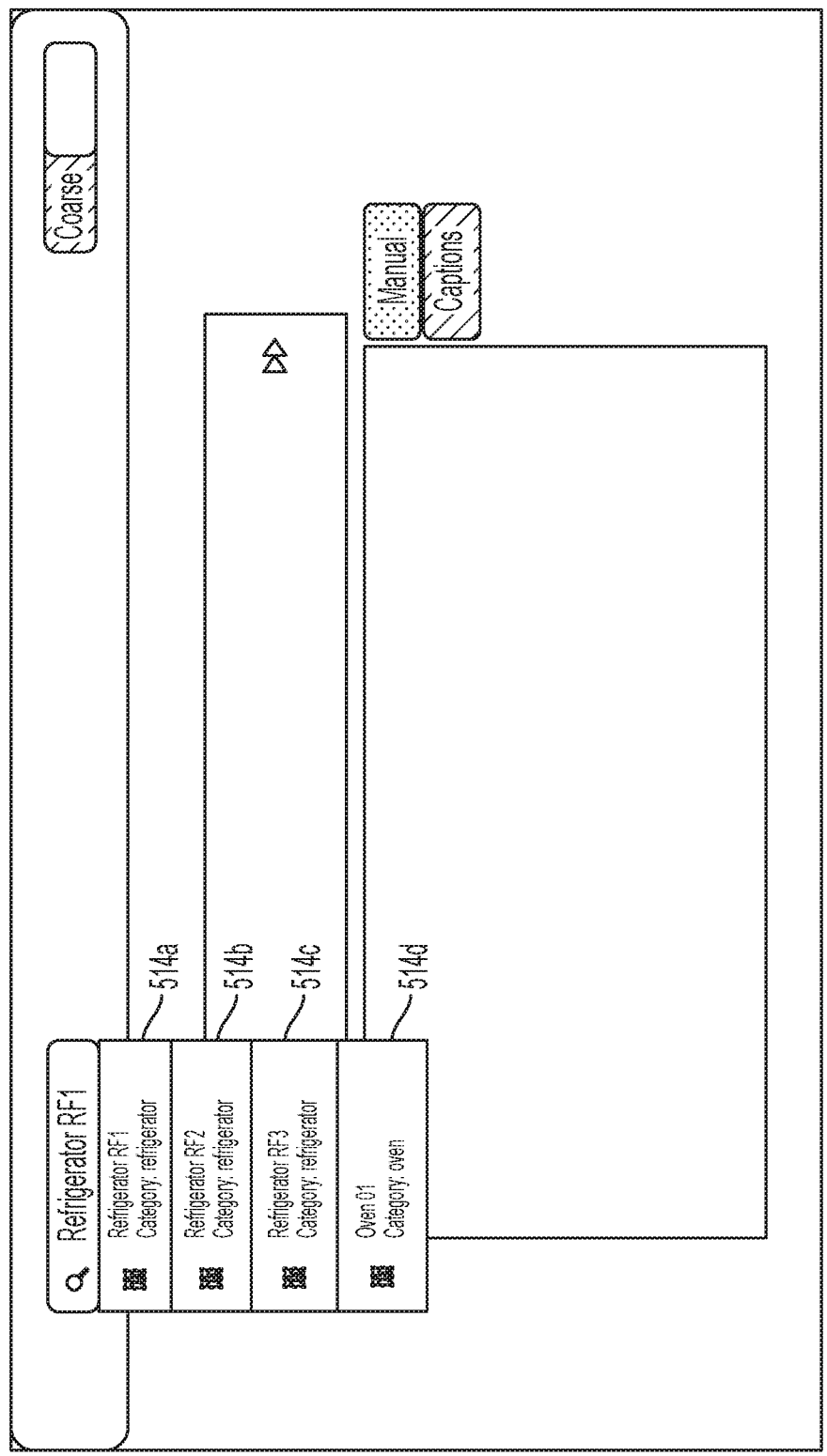

As shown in FIG. 5B, the user device 210 may display a set of search results 514a-514d, based on the user input in the search area 512. In this case, assume that the user selects the result 514a based on the result 514a matching the user input of "Refrigerator RF1."

Figure 5C:
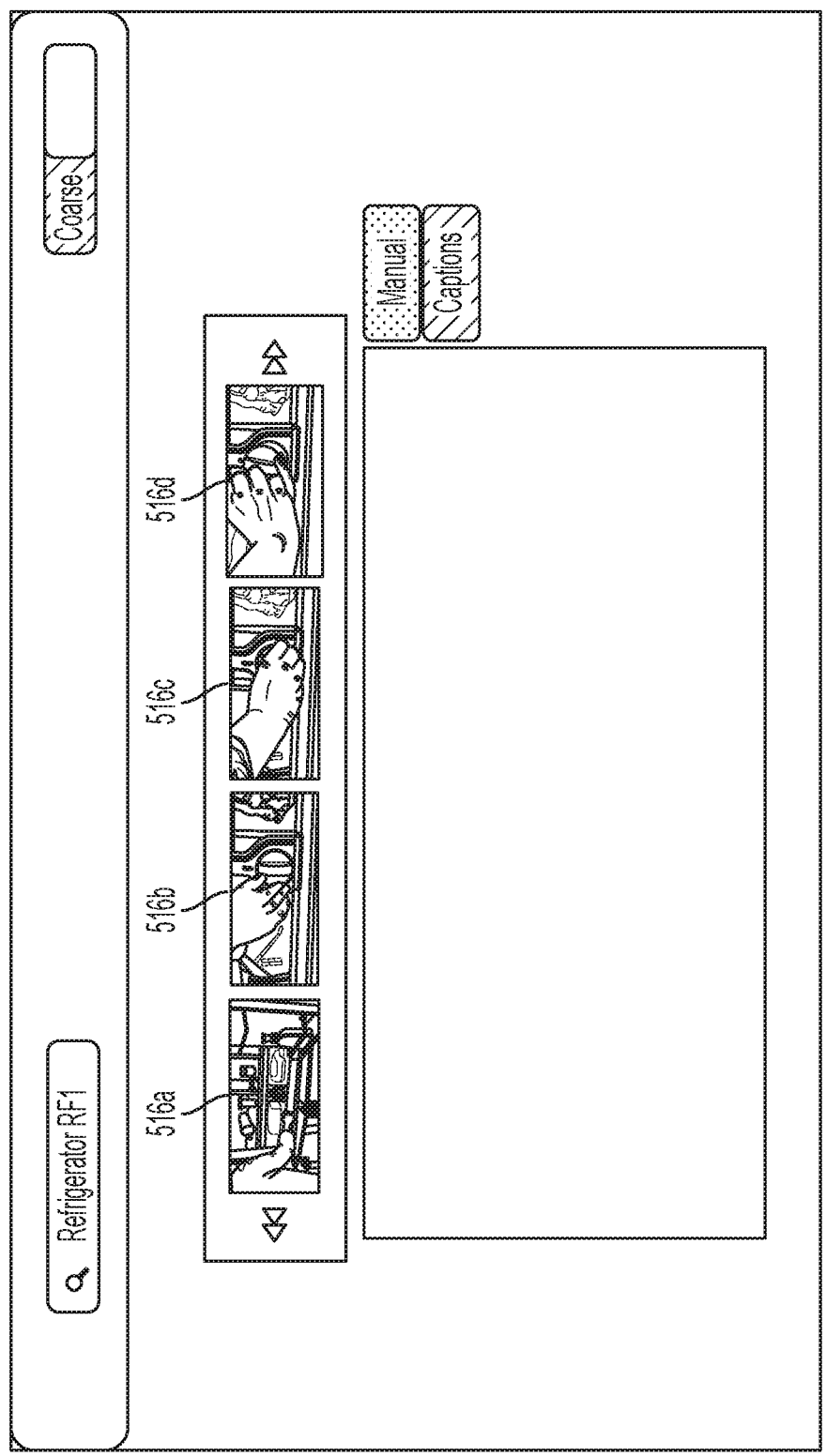

As shown in FIG. 5C, the user device 210 may provide, for display via the UI 500, image information 516a-516d in the image information area 502. As an example, the image information may correspond to an instructional video that describes the object. For example, the instructional video may correspond to a video that describes the functionality of a user device (e.g., a smart appliance), the object may correspond to the smart appliance, the set of operations may correspond to a set of user manipulations of the smart appliance, and the process may correspond to a function of the smart appliance.

Figure 5D:
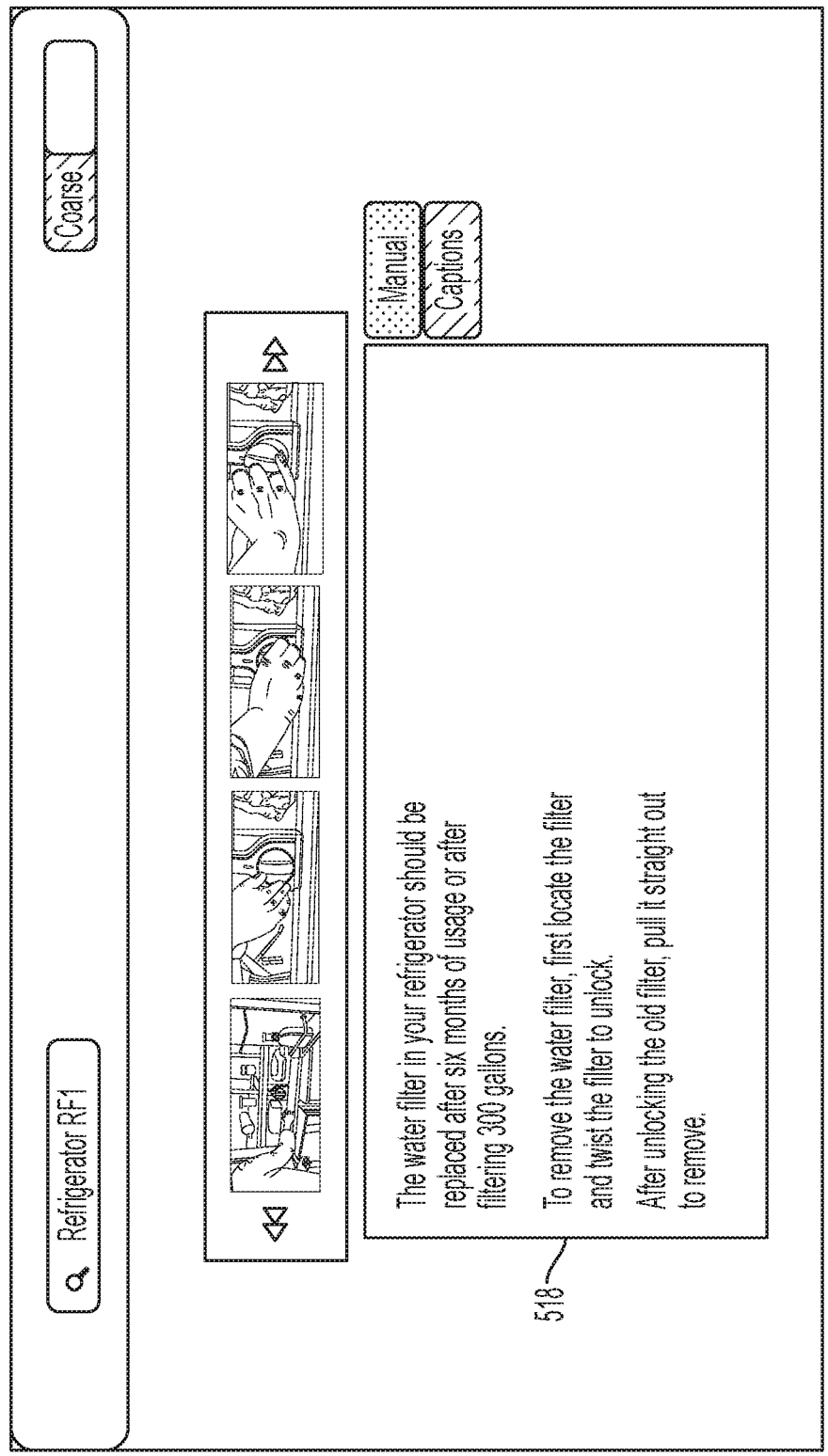

As shown in FIG. 5D, the user device 210 may provide, for display via the UI 500, text information 518 in the text information area 504. In this case, the text information 518 may corresponds to caption information of the image information 516a-516d based on the selection of the captions icon 510.

Figure 5E:
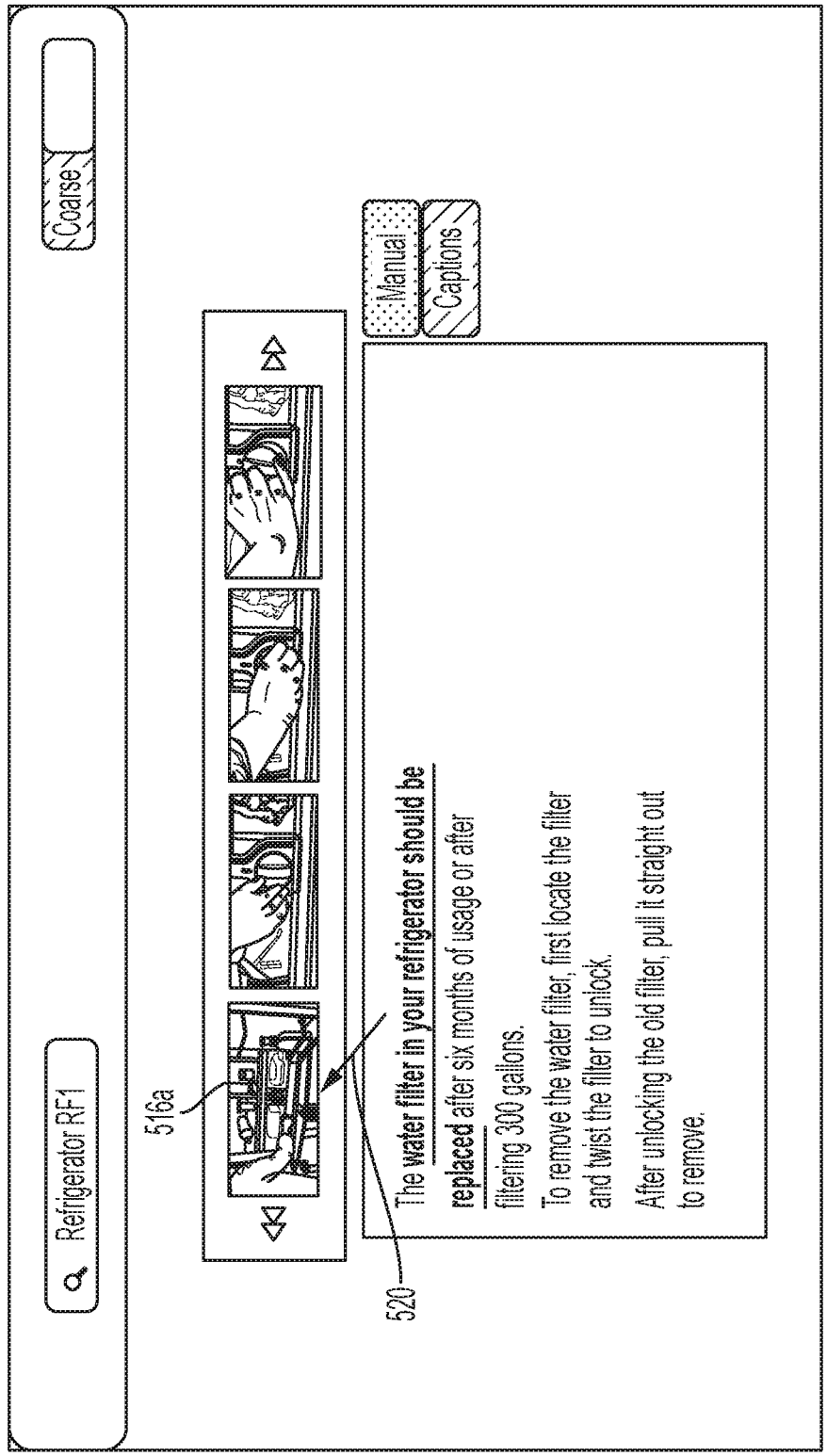
Figure 5F:
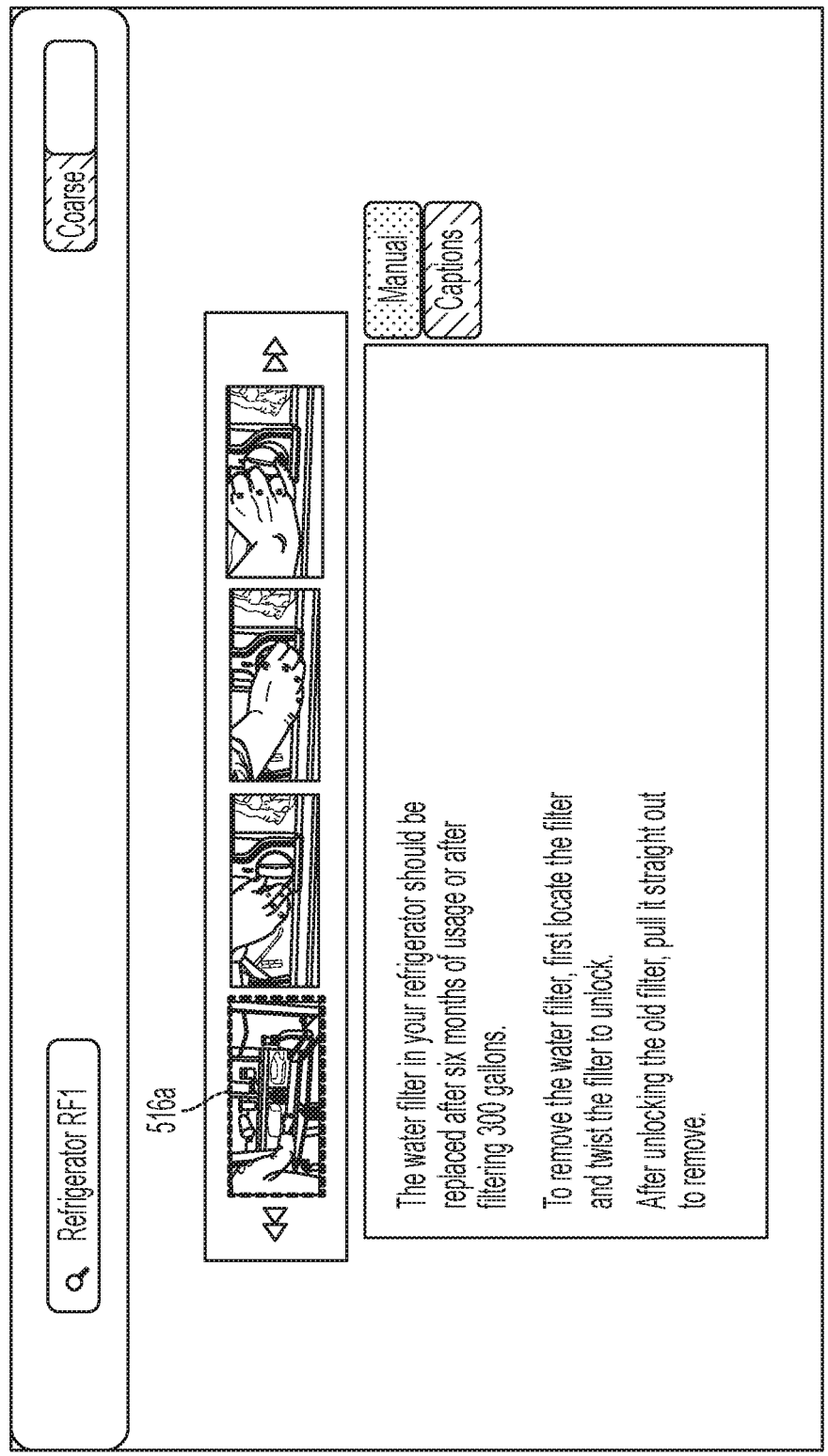

As shown in FIG. 5E, the user device 210 may receive, via the UI 500, a user input 520 that associates the image 516a with text information ("water filter in your refrigerator should be replaced"). In this way, the user device 210 may generate association information that associates the respective image information 516a with the corresponding text information, based on the user input. As shown in FIG. 5F, the user device 210 may provide, for display via the UI 500, information that identifies that association information has been generated for the image 516a. That is, as shown, the image 516a may be displayed with a red bounding box identifying that the association information for the image 516a has been generated.

Figure 6:
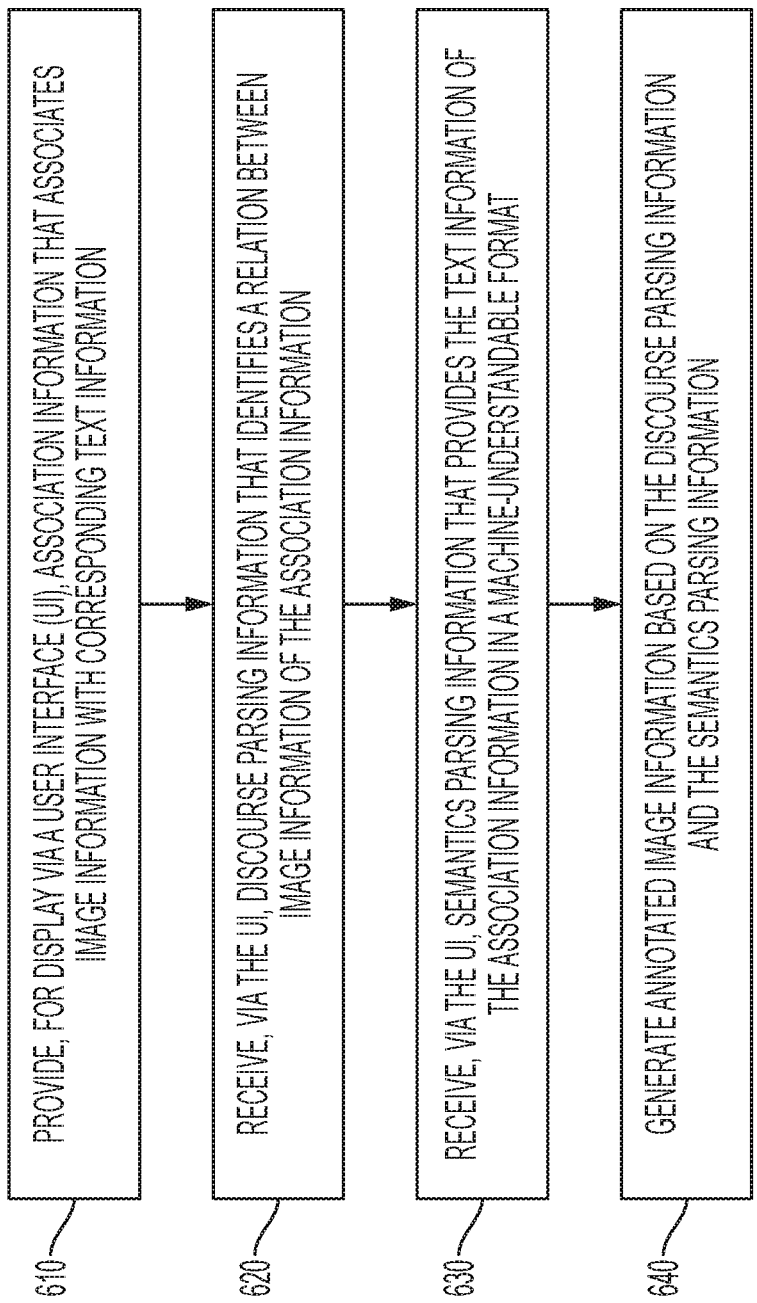
FIG. 6 is a flowchart of an example process for generating annotated image information via a user interface according to an embodiment.

FIG. 6 is a flowchart of an example process for generating annotated image information via a user interface according to an embodiment.

According to an embodiment, one or more process blocks of FIG. 6 may be performed by the user device 210. According to an embodiment, one or more process blocks of FIG. 6 may be performed by another device or a group of devices separate from or including the user device 210, such as the platform 220.

As shown in FIG. 6, process 600 may include providing, for display via a user interface (UI), association information that associates image information with corresponding text information (block 610).

The user device 210 may provide, for display via the UI for generating training data, association information in a first area of the UI for generating training data. For example, the user device 210 may display the image information and the associated text information in a first area of the UI for generating training data.

As further shown in FIG. 6, process 600 may include receiving, via the UI, discourse parsing information that identifies a relation between image information of the association information (block 620). The user device 210 may receive, via the UI, discourse parsing information based on a set of user inputs that identifies relations between the images of the image information.

The user device 210 may receive the discourse parsing information based on a set of user inputs. For example, the user may interact with the UI for generating training data in order to input the discourse parsing information. As examples, the user may perform a set of touch gestures that identifies relationships between the images of the image information.

Additionally, or alternatively, the user device 210 may receive discourse parsing information from the platform 220, and may generate updated discourse parsing information based on user interaction(s) with the received association information. For example, the platform 220 may generate the discourse parsing information using an AI model (e.g., as described in association with FIG. 8), and may provide the generated discourse parsing information to the user device 210. The user device 210 may display the generated discourse parsing information, and may receive user input(s) that rectifies, updates, etc. the generated discourse parsing information. Further, the user device 210 may provide feedback information based on the user input(s) to the platform 220 to update the AI model.

As further shown in FIG. 6, process 600 may include receiving, via the UI, semantics parsing information that provides the text information of the association information in a machine-understandable format (block 630).

The user device 210 may receive the semantics parsing information based on a set of user inputs. For example, the user may interact with the UI for generating training data in order to input the semantics parsing information. As examples, the user may perform a set of touch gestures that converts natural language text to a machine-understandable format or associates natural language text with a machine-understandable format.

Additionally, or alternatively, the user device 210 may receive semantics parsing information from the platform 220, and may generate updated semantics parsing information based on user interaction(s) with the received association information. For example, the platform 220 may generate the semantics parsing information using an AI model (e.g., as described in association with FIG. 8), and may provide the generated semantics parsing information to the user device 210. The user device 210 may display the generated semantics parsing information, and may receive user input(s) that rectifies, updates, etc. the generated semantics parsing information. Further, the user device 210 may provide feedback information based on the user input(s) to the platform 220 to update the AI model.

As further shown in FIG. 6, process 600 may include generating annotated image information based on the discourse parsing information and the semantics parsing information (block 640).

The annotated image information may include image information, machine-understandable text information, and association information that associates the machine-understandable text information with particular image information of the image information.

In this way, the user device 210 may provide the annotated image information to an AI model as training data, as described below.

The user device 210 may provide the annotated image information to the platform 220, and the platform 220 may provide the annotated image information to the AI model as training data. The AI model may be a model that is configured to associate image information with corresponding text information. For example, the AI model may receive image information and text information as inputs, and generate an output that associates respective image information with corresponding text information.

The AI model may be any type of AI model that utilizes a machine learning technique. For example, the AI model may be a deep learning model, a neural network, a decision tree, a support vector machine, a Bayesian network, or the like.

The platform 220 may provide the annotated image information to the AI model as training data in order to permit training of the AI model. In this way, the AI model may be trained using the annotated image information.

The platform 220 may input text information of the association information into a set of NLP models. For example, the platform 220 may input text information of the association information into a coreference resolution model. The coreference resolution model may be a model configured to identify particular text information that corresponds to a same underlying entity or object.

As another example, the platform 220 may input the text information of the association information into a discourse parsing model. The discourse parsing model may be a model configured to identify a relation between the text information of the association information.

As another example, the platform 220 may input the text information of the association information into a semantic parsing model. The semantic parsing model may be a model that is configured to convert natural language text to a machine-understandable format. The platform 220 may generate the annotated image information based on inputting the text information of the association information into one or more of the foregoing NLP models (or another type of NLP model).

The platform 220 may receive an output from the trained AI model, and may provide the output to the user device 210 to permit the user device 210 to display the output of the AI model. In this case, a user may interact with the output of the AI model in order to generate feedback information. The user device 210 may provide the feedback information to the platform 220, and the platform 220 may update the AI model based on the feedback information.

Although FIG. 6 shows example blocks of process 600, According to an embodiment, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7L are diagrams of an example user interface for generating annotated image information according to an embodiment.

Figure 7A:
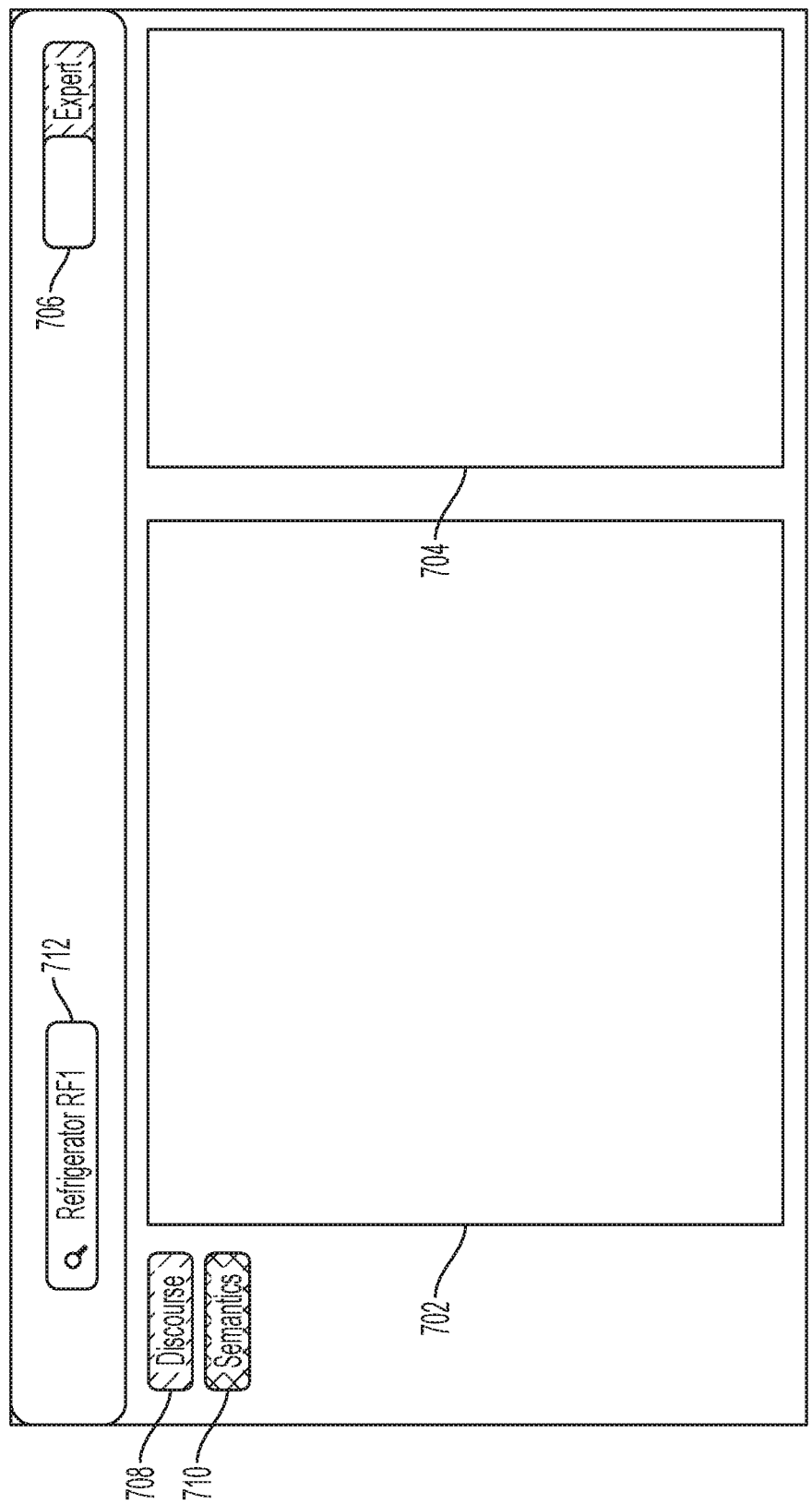
FIGS. 7A-7L are diagrams of an example user interface for generating annotated image information according to an embodiment.

As shown in FIG. 7A, the user device 210 may provide a UI 700 for generating training data. Specifically, as shown in FIG. 7A, the user device 210 may operate in a second mode (e.g., an expert mode), and display the UI 700 for generating annotated image information.

As shown, the UI 700 may include an association information area 702, a discourse parsing information area 704, a mode selection icon 706, a discourse parsing icon 708, a semantics parsing icon 710, and a search area 712.

The association information area 702 may be configured to display association information. For example, the association information area 702 may display image information, and display text information that is associated with the image information.

The discourse parsing information area 704 may be configured to display discourse parsing information. For example, the discourse parsing information area 704 may display image information, and may display information that identifies relations between the images of the image information.

The mode selection icon 706 may be configured to adjust a mode of the UI 700. For example, the mode selection icon 706 may be configured to switch between a first mode (e.g., a coarse mode) and a second mode (e.g., an expert mode). The coarse mode may be associated with generating association information, and the expert mode may be associated with generating annotated image information.

The discourse parsing icon 708 may be configured to select a sub-mode of the second mode. For example, the UI 700 may operate in a first sub-mode (e.g., a discourse parsing mode) of the second mode (e.g., the expert mode) based on a selection of the discourse parsing icon 708. In the first sub-mode, the UI 700 may display discourse parsing information.

The semantics parsing icon 710 may be configured to select a sub-mode of the second mode. For example, the UI 700 may operate in a second sub-mode (e.g., a semantics parsing mode) of the second mode (e.g., the expert mode) based on a selection of the semantics parsing icon 710. In the second sub-mode, the UI 700 may display semantics parsing information.

The search area 712 may be configured to receive an input that identifies a particular object. For example, as shown in FIG. 7A, the user may input text ("Refrigerator RF1") that corresponds to a particular object for which annotated image information is to be generated.

Based on the user input of the text, the UI 700 may display association information that has been generated for the object associated with the input text, as described below.

Figure 7B:
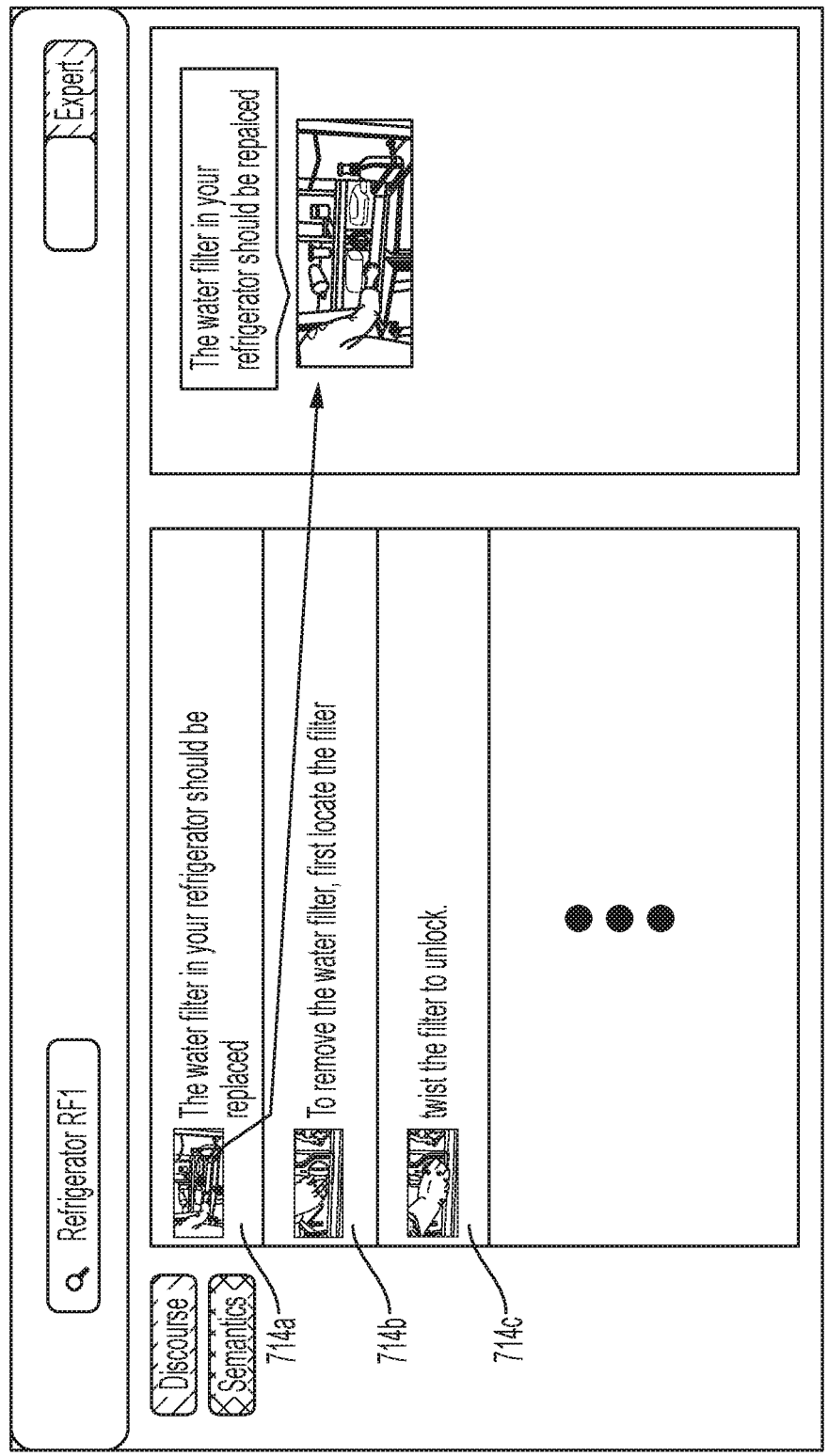

As shown in FIG. 7B, the UI 700 may display association information 714*a*, 714*b*, and 714*c* in the association information area 702, based on the user input in the search area 712. For example, as shown, the UI 700 may display images and corresponding text information in the association information area 702.

As shown in FIG. 7B, the UI 700 may receive a user input that selects a particular image associated with association information 714*a* to be placed in the discourse parsing information 704. As an example, the user may perform a drag touch gesture by selecting the image associated with association information 714*a* in the association information area 702 and dragging the image to the discourse parsing information area 704. Based on the user input, the UI 700 may display the association information 714*a* in the discourse parsing information area 704.

The user may perform additional touch gestures to select association information to be placed in the discourse parsing information area 704. For instance, the user may select all of the desired association information for which discourse parsing information is to be generated.

Figure 7C:
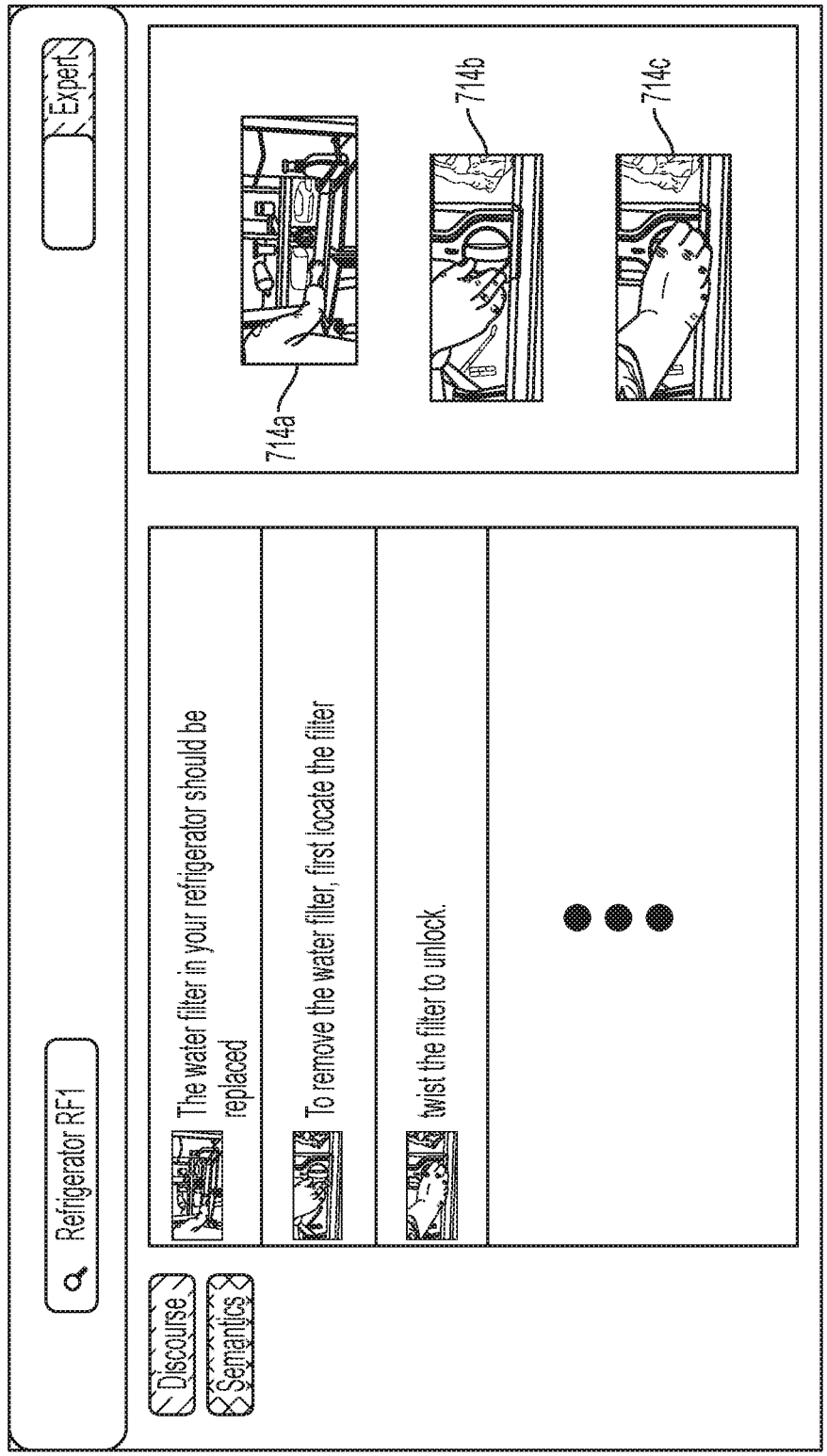

As shown in FIG. 7C, the UI 700 may display association information 714*a*-714*c* in the discourse parsing information area 704. For example, the UI 700 may receive a set of user inputs that select association information 712*b*-714*c* to be placed in the discourse parsing information area 704, and display association information 714*a*-714*c* in the discourse parsing information area 704.

After selecting all of the desired association information, the user may interact with the UI 700 to generate discourse parsing information. For instance, the user may select a particular association information that is displayed in the discourse parsing information area 704.

Figure 7D:
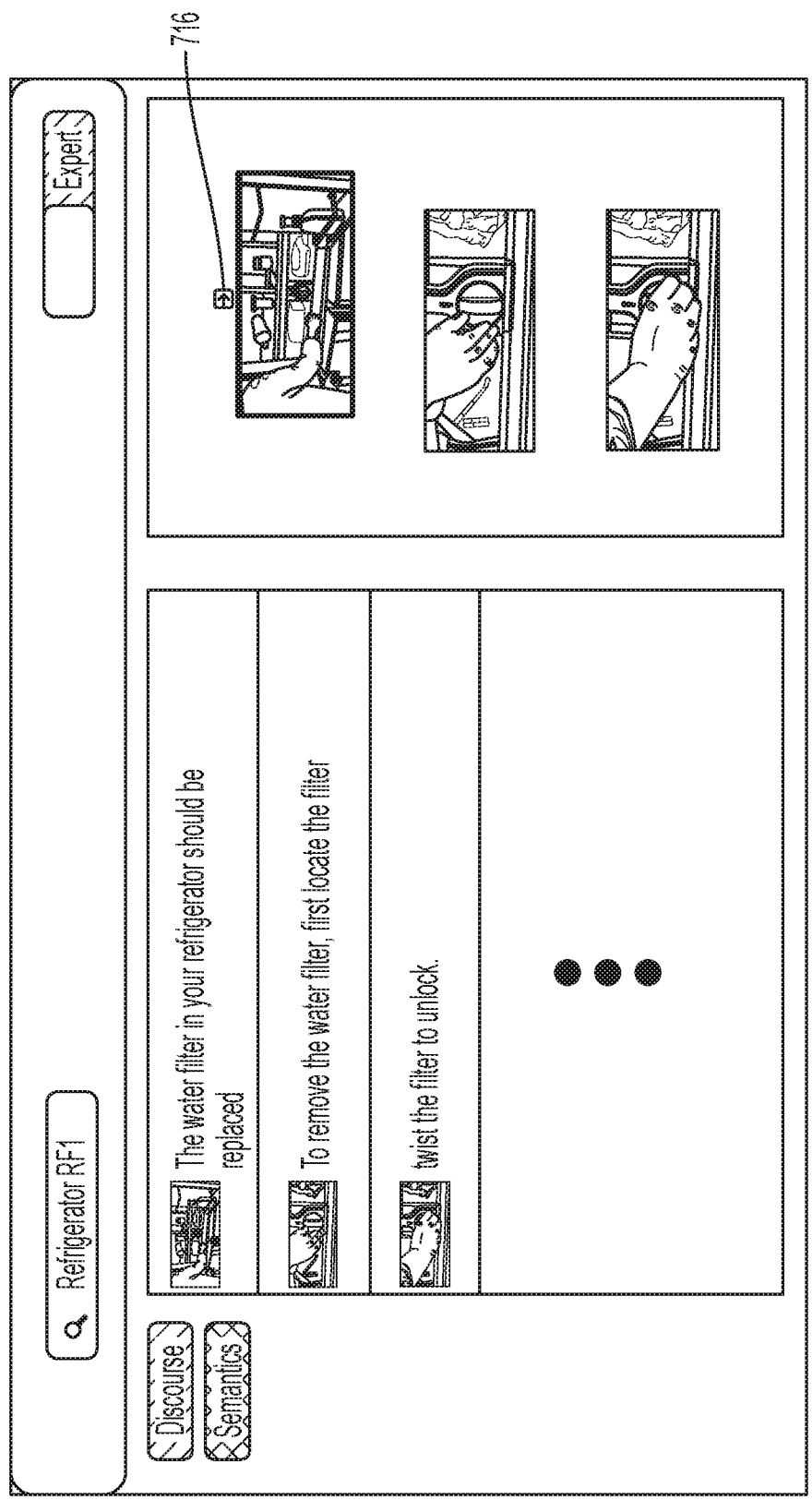

As shown in FIG. 7D, the UI 700 may display information that identifies that the association information 714*a* is selected. For example, the UI 700 may display a red bounding box around the association information 714*a* indicating that the association information 714*a* is selected. Additionally, the UI 700 may display an arrow icon 716 identifying that discourse parsing information is to be generated for the association information 714*a*.

Figure 7E:
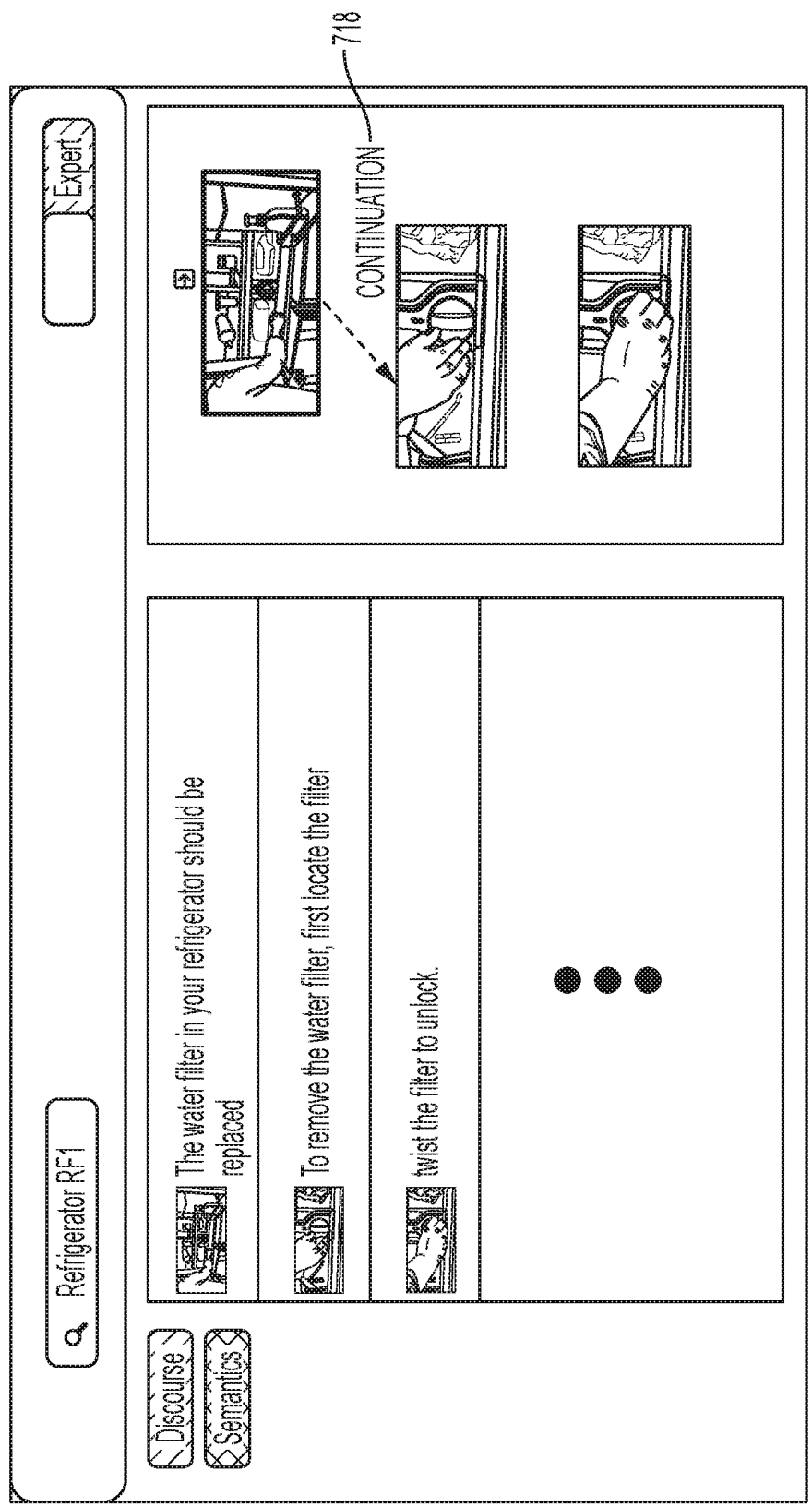

As shown in FIG. 7E, the UI 700 may receive an input of discourse parsing information 718. For example, the user may input information identifying a relation between the association information 714*a* and the association information 714*b*. As examples, the user may perform a touch gesture that links the association information 714*a* and the association information 714*b*. Further, the user may input information ("continuation") that identifies a relation between the association information 714*a* and the association information 714*b*.

Figure 7F:
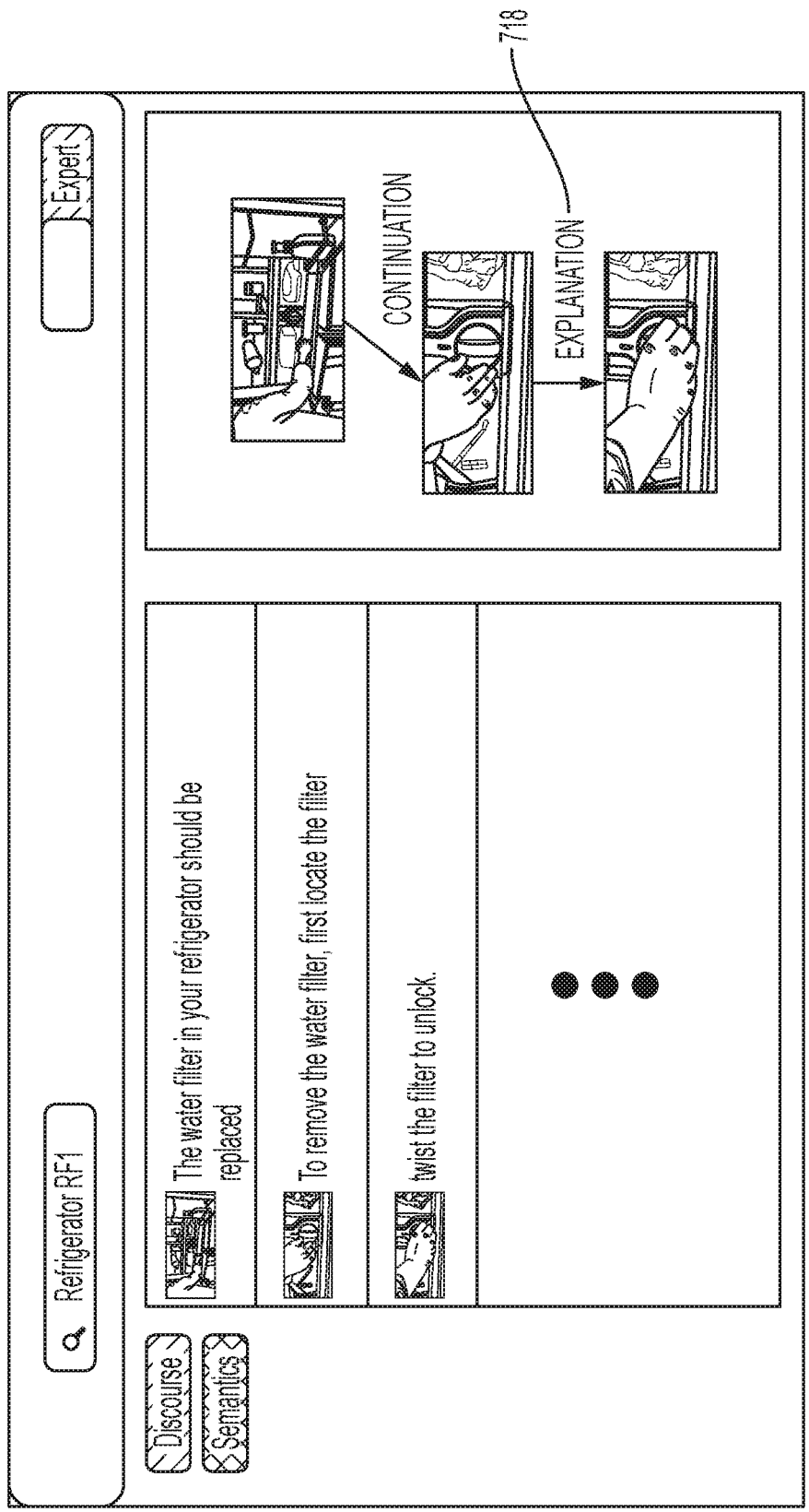

As shown in FIG. 7F, the UI 700 may receive an input of discourse parsing information 718. For example, the user may input information identifying a relation between the association information 714*b* and the association information 714*c*. As examples, the user may perform a touch gesture that links the association information 714*b* and the association information 714*c*. Further, the user may input information ("explanation") that identifies a relation between the association information 714*b* and the association information 714*c*.

In this way, the UI 700 may receive discourse parsing information based on a set of user inputs received via the UI 700.

Figure 7G:
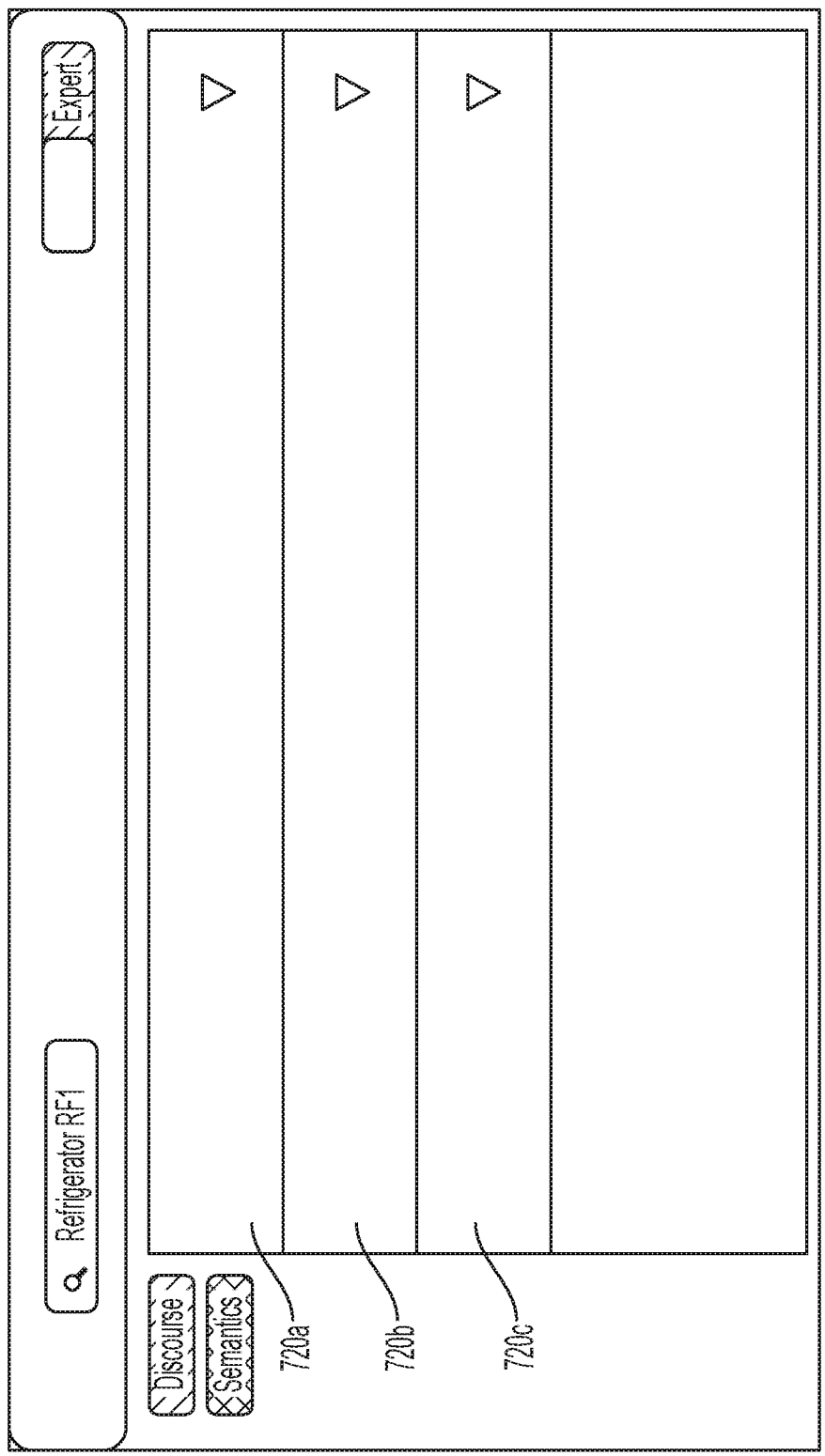

As shown in FIG. 7G, the user device 210 may operate in the second sub-mode (e.g., the semantics parsing mode) of the second mode (e.g., the expert mode), and display the UI 700 for generating semantics parsing information, based on a selection of the semantics parsing icon 710. For example, the UI 700 may display a set of association information areas 720*a*-720*c*.

Figure 7H:
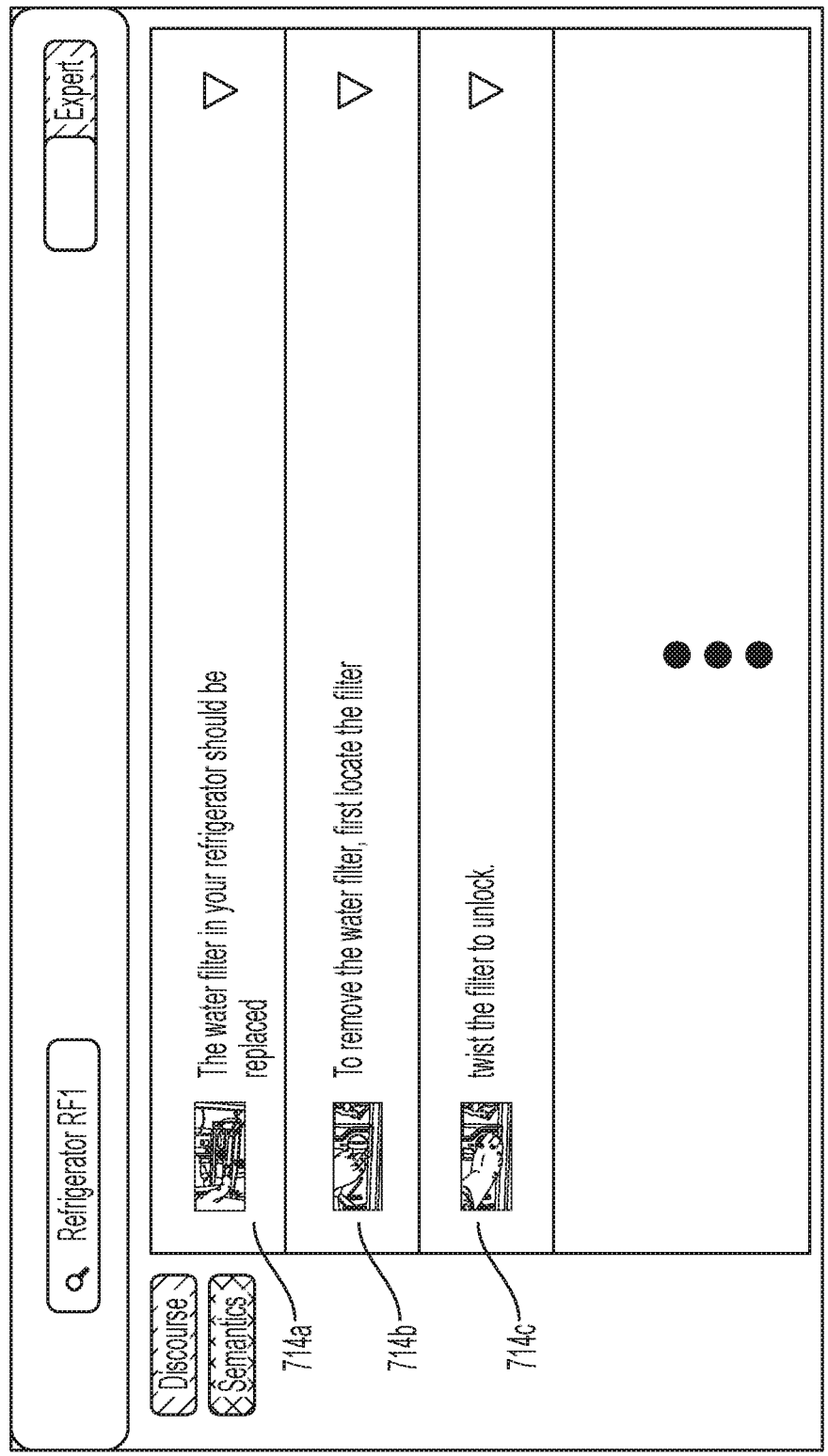

As shown in FIG. 7H, the UI 700 may display association information 714*a* in the association information area 720*a*, display association information 714*b* in the association information area 720*b*, and display association information 714*c* in the association information area 720*c*.

Figure 7I:
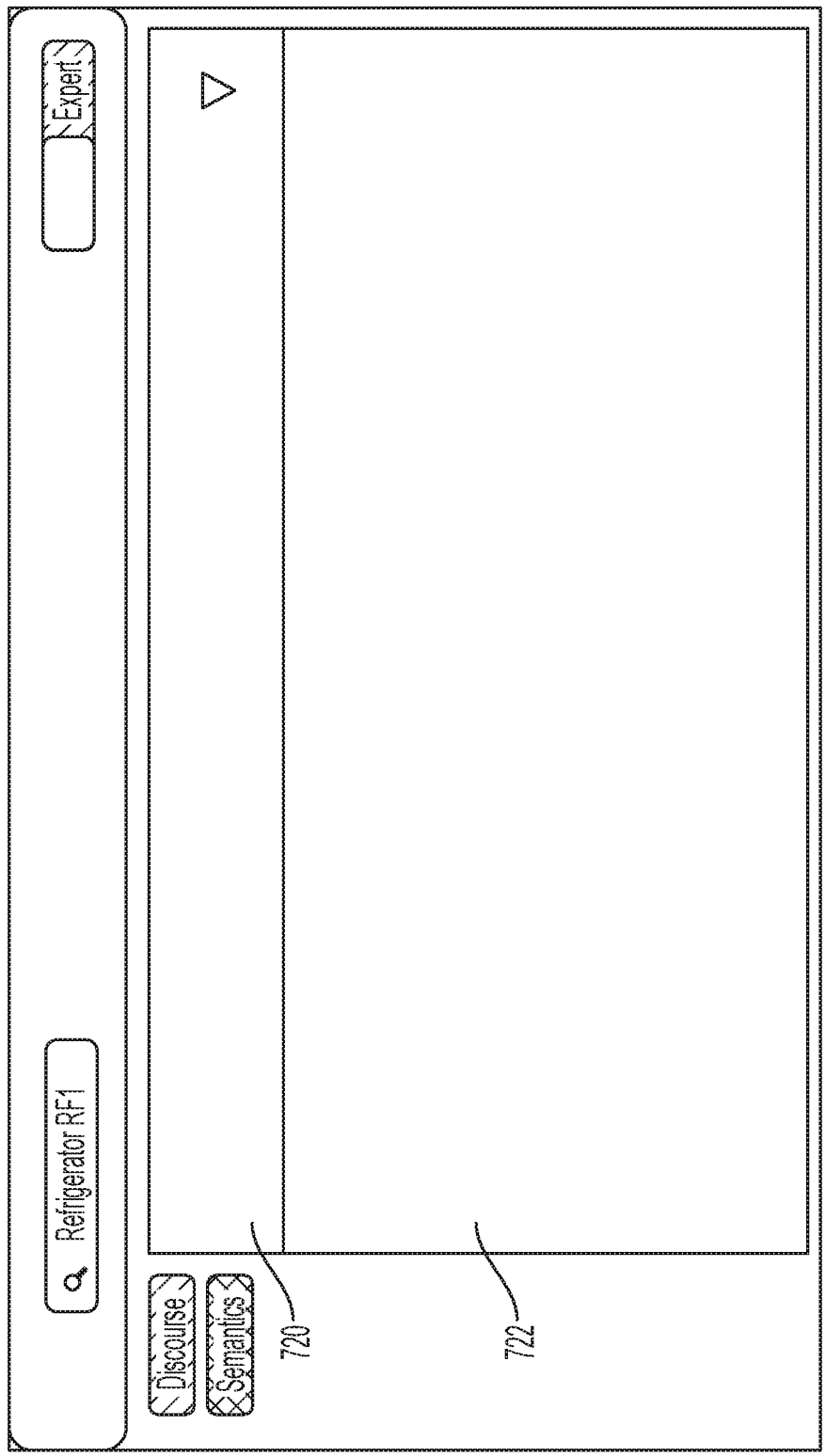

As shown in FIG. 7I, the UI 700 may display an association information area 720, and a semantics parsing information area 722. The association information area 720 may display selected association information.

Figure 7J:
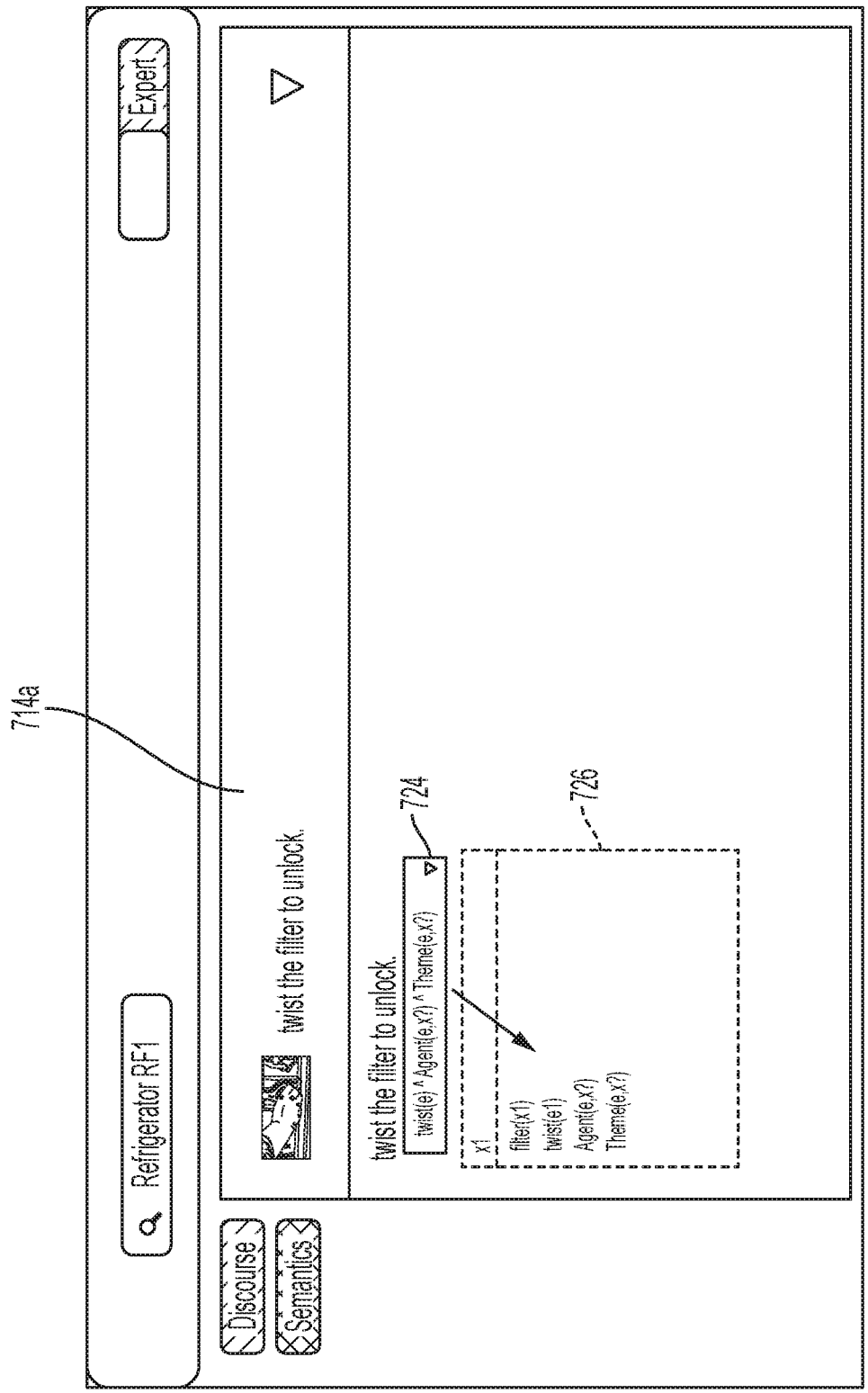

As shown in FIG. 7J, the UI 700 may display association information 714*a* in the association information area 720, display a semantics parsing information menu 724, and display semantics parsing information 726. The semantics parsing information 726 may permit the user to input semantics parsing information associated with the association information 714*a*. As shown in FIG. 7J, the UI 700 may display information that identifies that particular semantics parsing information is to be input. For example, the UI 700 may display "x?" which indicates that a particular value of "x" is to be input in the various fields associated with "x?".

Figure 7K:
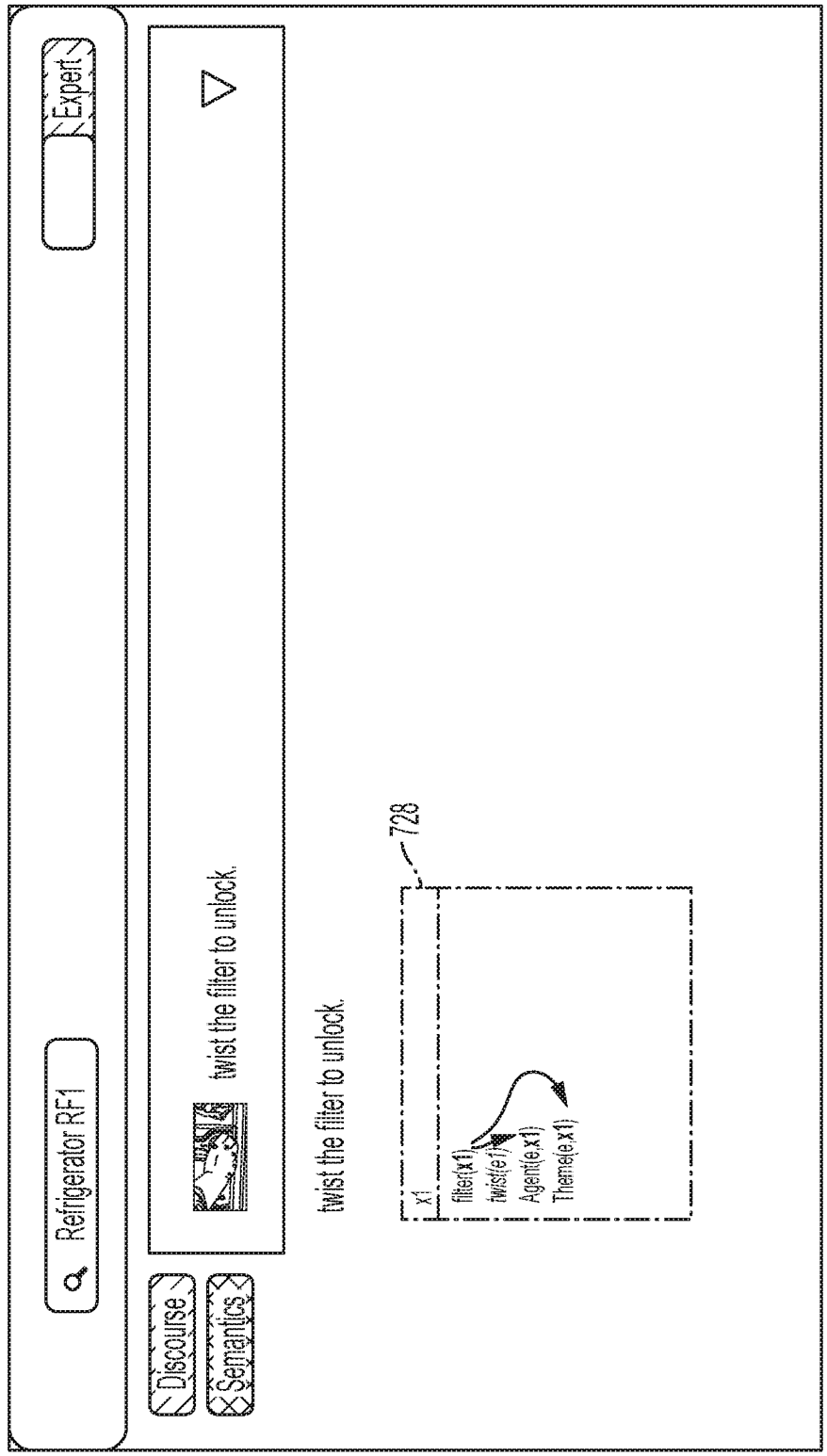

As shown in FIG. 7K, the UI 700 may receive information 728 that identifies the particular value of "x" (i.e., "x1") to be input in the various fields associated with "x?".

Figure 7L:
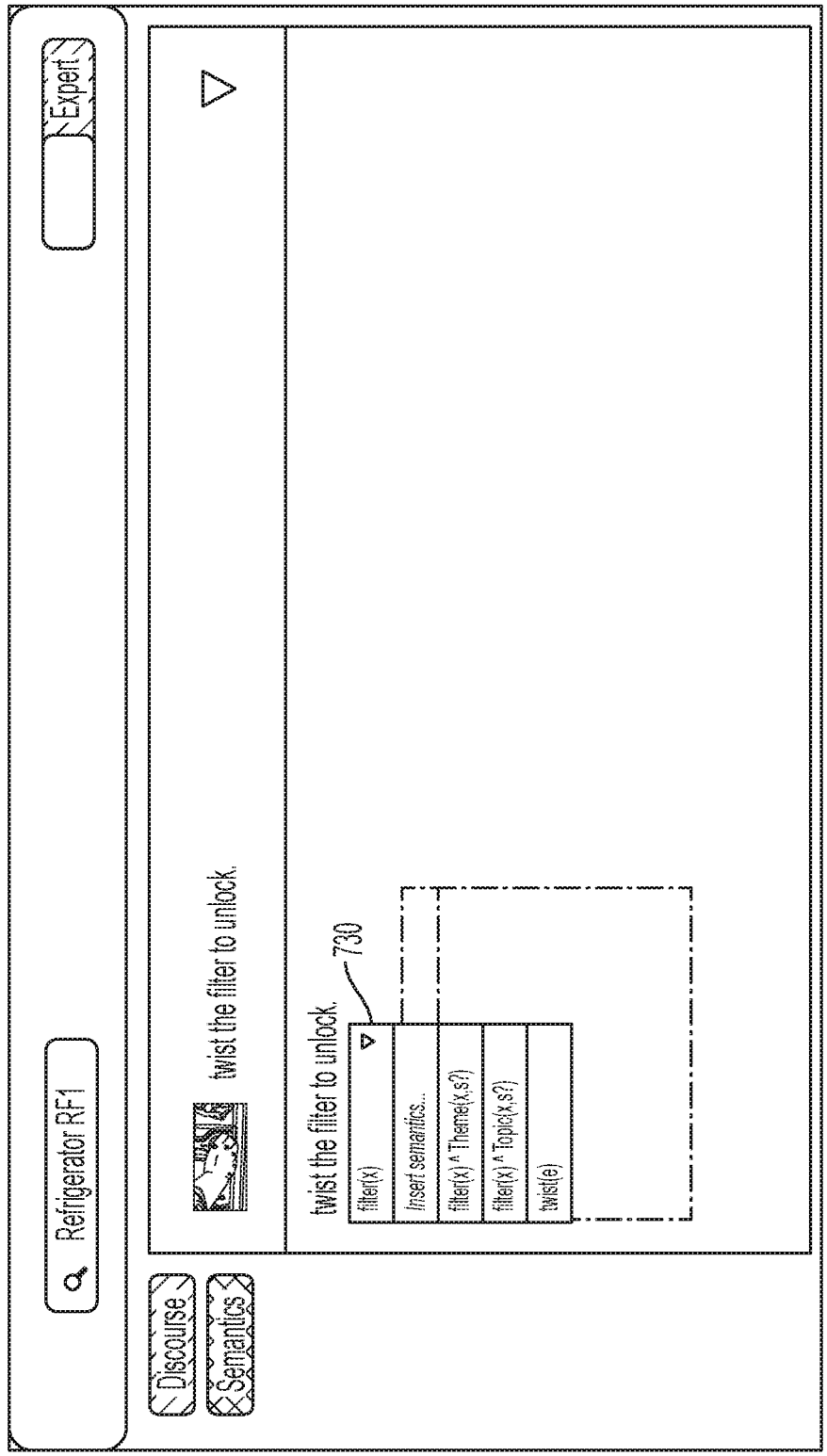

As shown in FIG. 7L, the UI 700 may display a menu 730 that permits the user to input various semantics parsing information.

In this way, the user may interact with the UI 700 to generate annotated image information by inputting discourse parsing information and semantics parsing information.

Figure 8:
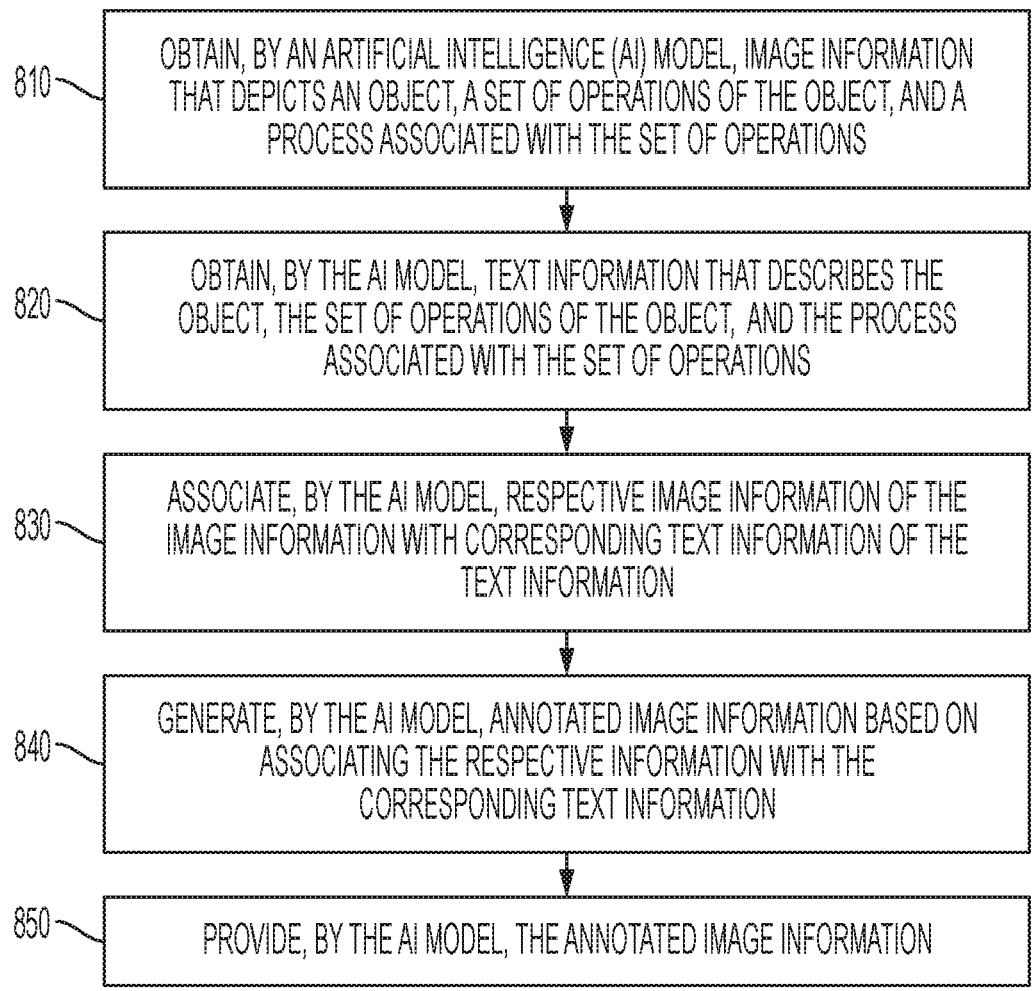
FIG. 8 is a flowchart of an example process for generating annotated image information by an AI model according to an embodiment.

FIG. 8 is a flowchart of an example process for generating annotated image information by an AI model according to an embodiment.

According to an embodiment, one or more process blocks of FIG. 8 may be performed by platform 220. According to an embodiment, one or more process blocks of FIG. 8 may be performed by another device or a group of devices separate from or including platform 220, such as user device 210.

As shown in FIG. 8, process 800 may include obtaining, by an artificial intelligence (AI) model, image information that depicts an object, a set of operations of the object, and a process associated with the set of operations (block 810).

The AI model may refer to the model described above in association with FIG. 4. According to an embodiment, the platform 220 may store the AI model. Alternatively, another device may store the AI model, and the platform 220 may access the AI model via the other device. Additionally, or alternatively, the platform 220 may provide the AI model to the user device 210.

The AI model may obtain input image information. The input image information may be substantially the same as the image information described above in connection with FIG. 4.

As further shown in FIG. 8, process 800 may include obtaining, by the AI model, text information that describes the object, the set of operations of the object, and the process associated with the set of operations (block 820).

The AI model may obtain input text information. The input text information may be substantially the same as the text information described above in connection with FIG. 4.

As further shown in FIG. 8, process 800 may include associating, by the AI model, respective image information of the image information with corresponding text information of the text information (block 830).

The AI model may associate respective image information with corresponding text information. The AI model may process the image information using any number of image processing techniques, such as image processing, machine vision, computer vision, pattern recognition, image analysis, or the like. Further, the AI model may process the text information using any number of NLP techniques, such as coreference resolution, discourse parsing, semantic parsing, or the like.

The AI model may associate the image information and the text information, and generate annotated image information, as described below.

As further shown in FIG. 8, process 800 may include generating, by the AI model, annotated image information based on associating the respective image information with the corresponding text information (block 840).

The AI model may generate the annotated image information based on processing the input image information and the text information. The annotated image information may be substantially the same as described above in association with FIG. 4.

As further shown in FIG. 8, process 800 may include providing, by the AI model, the annotated image information (block 850).

The AI model may provide the annotated image information to a device to permit the device to utilize the annotated image information. For example, the AI model may provide the annotated image information to a chatbot application of a user device 210 to permit the chatbot application to utilize the annotated image information to respond to user queries received via the user device 210, as described below in association with FIG. 9.

Although FIG. 8 shows example blocks of process 800, According to an embodiment, process 800 may include additional blocks, fewer blocks, different blocks, or differently arranged blocks than those depicted in FIG. 8. Additionally, or alternatively, two or more of the blocks of process 800 may be performed in parallel.

Figure 9:
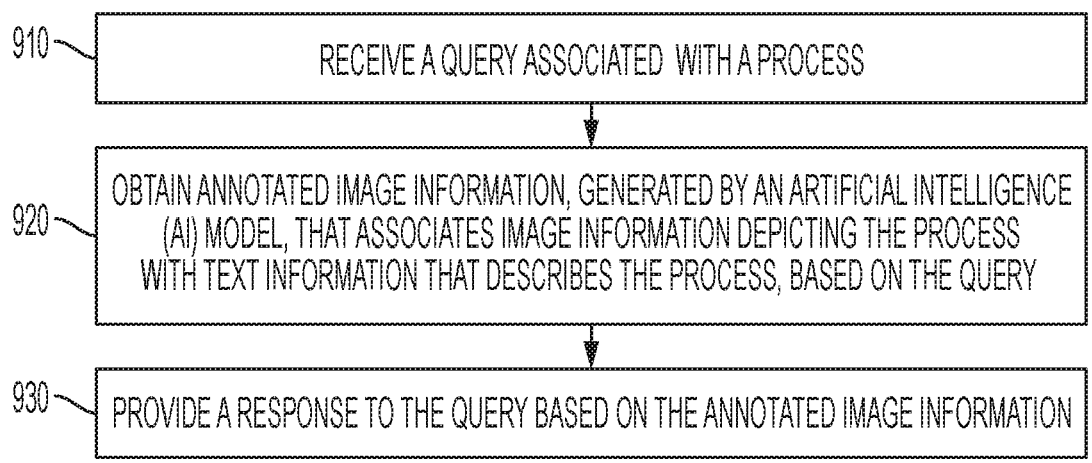
FIG. 9 is a flowchart of an example process for providing annotated image information generated by an AI model based on a query according to an embodiment.

FIG. 9 is a flowchart of an example process for providing annotated image information generated by an AI model based on a query according to an embodiment.

According to an embodiment, one or more process blocks of FIG. 9 may be performed by user device 210. According to an embodiment, one or more process blocks of FIG. 9 may be performed by another device or a group of devices separate from or including user device 210, such as platform 220.

As shown in FIG. 9, process 900 may include receiving a query associated with a process (block 910).

The user device 210 may execute a chatbot application, and may receive a query based on executing the chatbot application. For example, a user of the user device 210 may input a query (e.g., a verbal query, a text query, or the like) to user device 210 regarding a process.

As further shown in FIG. 9, process 900 may include obtaining annotated image information, generated by an AI model, that associates image information depicting the process with text information that describes the process, based on the query (block 920).

Based on the query, the user device 210 may process the query, and identify annotated image information that corresponds to the query. For example, the user device 210 may identify an object, an operation, a process, etc. associated with the query, and identify annotated image information that corresponds to the object, operation, process, etc. The annotated image information may be stored via the user device 210, or the user device 210 may access the annotated image information via platform 220.

The user device 210 may identify the annotated image information, generate a response to the query based on the annotated image information, and provide, via an output component, the response to permit the user to identify the response, as described below.

As further shown in FIG. 9, process 900 may include providing a response to the query based on the annotated image information (block 930).

The user device 210 may provide, for display, a response that includes image information and text information that is responsive to the query. As an example, the response may be a subset of a video that corresponds to the query. As mentioned above elsewhere herein, a user of the user device 210 might not be interested in watching an entire video, and may desire to more quickly identify a pertinent section of the video. In this case, the user device 210 may provide a response that identifies the pertinent portion of the video.

Although FIG. 9 shows example blocks of process 900, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device for providing a user interface (UI) for generating training data for an artificial intelligence (AI) model, the device comprising:
  a memory configured to store instructions; and
  a processor configured to execute the instructions to:
    provide, for display via the UI, image information that depicts an object, a set of operations of the object, and a process associated with the set of operations;
    provide, for display via the UI, text information that describes the object, the set of operations of the object, and the process associated with the set of operations;
    receive, via the UI, a first touch input in association with the image information, and a second touch input in association with the text information to associate respective image information of the image information with corresponding text information of the text information; and
    generate association information that associates the respective image information with the corresponding text information, based on the first touch input and the second touch input,
    wherein the image information is associated with an instructional video regarding the object, and wherein the text information corresponds to at least one of a product manual associated with the object, or captions associated with the instructional video.

2. The device of claim 1, wherein the processor is further configured to:
  receive, via the UI, discourse parsing information that identifies a relation between image information of the association information; and
  generate annotated image information based on the discourse parsing information.

3. The device of claim 2, wherein the processor is further configured to:
  input the annotated image information into the AI model as training data for the AI model to permit the AI model to identify the relation between the image information of the association information.

4. The device of claim 1, wherein the processor is further configured to:
  receive, via the UI, semantics parsing information that provides the text information of the association information in a machine-understandable format; and
  generate annotated image information based on the semantics parsing information.

5. The device of claim 4, wherein the processor is further configured to:
  input the annotated image information into the AI model as training data for the AI model to convert the text information of the association information to the machine-understandable format.

6. The device of claim 1, wherein the processor is further configured to:
  input the association information into the AI model as training data for the AI model to permit the AI model to associate the respective image information with the corresponding text information.

7. A method for providing a user interface (UI) for generating training data for an artificial intelligence (AI) model, the method comprising:
  providing, for display via the UI, image information that depicts an object, a set of operations of the object, and a process associated with the set of operations;
  providing, for display via the UI, text information that describes the object, the set of operations of the object, and the process associated with the set of operations;
  receiving, via the UI, a first touch input in association with the image information, and a second touch input in association with the text information to associate respective image information of the image information with corresponding text information of the text information; and
  generating association information that associates the respective image information with the corresponding text information, based on the first touch input and the second touch input,
  wherein the image information is associated with an instructional video regarding the object, and wherein the text information corresponds to at least one of a product manual associated with the object, or captions associated with the instructional video.

8. The method of claim 7, further comprising:
  receiving, via the UI, discourse parsing information that identifies a relation between image information of the association information; and
  generating annotated image information based on the discourse parsing information.

9. The method of claim 8, further comprising:
  inputting the annotated image information into the AI model as training data for the AI model to permit the AI model to identify the relation between the image information of the association information.

10. The method of claim 7, further comprising:
  receiving, via the UI, semantics parsing information that provides the text information of the association information in a machine-understandable format; and
  generating annotated image information based on the semantics parsing information.

11. The method of claim 10, further comprising:
  inputting the annotated image information into the AI model as training data for the AI model to permit the AI model to convert the text information of the association information to the machine-understandable format.

12. The method of claim 7, further comprising:
  inputting the association information into the AI model as training data for the AI model to permit the AI model to associate the respective image information with the corresponding text information.

13. A non-transitory computer-readable medium storing instructions, the instructions comprising:
  one or more instructions that, when executed by one or more processors of a device for training an artificial intelligence (AI) model, cause the one or more processors to:
    provide, for display via the UI, image information that depicts an object, a set of operations of the object, and a process associated with the set of operations;
    provide, for display via the UI, text information that describes the object, the set of operations of the object, and the process associated with the set of operations;

receive, via the UI, a first touch input in association with the image information, and a second touch input in association with the text information to associate respective image information of the image information with corresponding text information of the text information; and generate association information that associates the respective image information with the corresponding text information, based on the first touch input and the second touch input, wherein the image information is associated with an instructional video regarding the object, and wherein the text information corresponds to at least one of a product manual associated with the object or captions associated with the instructional video.

14. The non-transitory computer-readable medium of claim 13, wherein the one or more instructions further cause the one or more processors to:

receive, via the UI, discourse parsing information that identifies a relation between image information of the association information; and generate annotated image information based on the discourse parsing information.

15. The non-transitory computer-readable medium of claim 14, wherein the one or more instructions further cause the one or more processors to:

receive, via the UI, semantics parsing information that provides the text information of the association information in a machine-understandable format; and input the annotated image information and the semantics parsing information into the AI model as training data for the AI model to permit the AI model to identify the relation between the image information of the association information, and to permit the AI model to convert the text information of the association information to the machine-understandable format.

16. The non-transitory computer-readable medium of claim 13, wherein the one or more instructions further cause the one or more processors to:

receive, via the UI, semantics parsing information that provides the text information of the association information in a machine-understandable format; and generate annotated image information based on the semantics parsing information.

17. The non-transitory computer-readable medium of claim 13, wherein the one or more instructions further cause the one or more processors to:

input the association information into the AI model as training data for the AI model to permit the AI model to associate the respective image information with the corresponding text information.

* * * * *